US008314619B2

(12) United States Patent
Takiguchi

(10) Patent No.: US 8,314,619 B2
(45) Date of Patent: Nov. 20, 2012

(54) DISTANCE DETECTION SYSTEM

(75) Inventor: Kiyoaki Takiguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1837 days.

(21) Appl. No.: 10/558,921

(22) PCT Filed: May 19, 2004

(86) PCT No.: PCT/JP2004/007142
§ 371 (c)(1),
(2), (4) Date: Dec. 2, 2005

(87) PCT Pub. No.: WO2004/109325
PCT Pub. Date: Dec. 16, 2004

(65) Prior Publication Data
US 2007/0040545 A1    Feb. 22, 2007

(30) Foreign Application Priority Data
Jun. 5, 2003   (JP) ................. P2003-160816

(51) Int. Cl.
G01R 31/28    (2006.01)
G01R 29/12    (2006.01)
G01R 27/26    (2006.01)
H04B 7/24     (2006.01)
(52) U.S. Cl. ........... 324/530; 324/457; 324/662; 455/39
(58) Field of Classification Search .......... 324/527, 324/530, 662
See application file for complete search history.

(56) References Cited

U.S. PATENT DOCUMENTS 3,341,810 A      9/1967  Wallen, Jr.
4,789,267 A  *  12/1988  Babendererde et al. ...... 405/146
5,170,172 A  *  12/1992  Weinstein ..................... 342/458
5,578,933 A  *  11/1996  Nonaka ......................... 324/639
5,796,827 A  *   8/1998  Coppersmith et al. ....... 713/182
(Continued)

FOREIGN PATENT DOCUMENTS
EP     1 100 218 A3    1/2005
(Continued)

OTHER PUBLICATIONS

Akinori Shibuya et al.; "Highly Accurate Position Detection Using Normalized Least Square Method"; Research Report of Information Processing Society of Japan; vol. 2001, No. 83 (MBL-18 ITS-6); pp. 9-14; 2001.

(Continued)

Primary Examiner — Jeff Natalini
(74) Attorney, Agent, or Firm — Finnegan, Henderson, Farabow, Garrett & Dunner, LLP

(57) ABSTRACT

A distance detection system is disclosed. The distance detection system includes an electric-field forming apparatus and an electric-field receiving apparatus. Quasi-electrostatic-field forming means is included in the electric-field forming apparatus. The quasi-electrostatic-field forming means is for forming quasi-electrostatic fields for a plurality of frequencies. The intensity of the quasi-electrostatic field for each frequency falls below a predetermined threshold intensity at a different distance from the quasi-electrostatic-field forming means. Distance detection means is included in either one of the electric-field forming apparatus and the electric-field receiving apparatus. The distance detection means is for detecting a distance between the electric-field forming apparatus and the electric-field receiving apparatus, based on the frequency of a quasi-electrostatic field received by the electric-field receiving apparatus.

17 Claims, 19 Drawing Sheets

U.S. PATENT DOCUMENTS

| | | | |
|---|---|---|---|
| 5,914,701 A | 6/1999 | Gersheneld et al. | |
| 6,223,018 B1 | 4/2001 | Fukumoto et al. | |
| 6,307,473 B1 * | 10/2001 | Zampini et al. | 340/572.1 |
| 6,336,031 B1 * | 1/2002 | Schyndel | 455/41.2 |
| 6,454,708 B1 * | 9/2002 | Ferguson et al. | 600/300 |
| 6,507,662 B1 * | 1/2003 | Brooks | 382/115 |
| 6,696,929 B2 * | 2/2004 | Igaki et al. | 340/435 |
| 7,107,012 B2 * | 9/2006 | Kashiwagi et al. | 455/63.4 |
| 7,432,718 B2 * | 10/2008 | Ishihara et al. | 324/457 |
| 2003/0109959 A1 * | 6/2003 | Tajima et al. | 700/245 |
| 2005/0135459 A1 * | 6/2005 | Ginzburg et al. | 375/146 |
| 2005/0219114 A1 * | 10/2005 | Kawabe et al. | 342/47 |
| 2006/0077616 A1 | 4/2006 | Takiguchi | |

FOREIGN PATENT DOCUMENTS

| | | |
|---|---|---|
| EP | 1 598 965 | 11/2005 |
| JP | 06-174831 | 6/1994 |
| JP | 6-174831 | 6/1994 |
| JP | 07-311887 | 11/1995 |
| JP | 7-311887 | 11/1995 |
| JP | 8-315276 | 11/1996 |
| JP | 08-315276 | 11/1996 |
| JP | 10-229357 | 8/1998 |
| JP | 2000-149198 | 5/2000 |
| JP | 2000-216628 | 8/2000 |
| JP | 2001-134890 | 5/2001 |
| JP | 2001-144662 | 5/2001 |
| JP | 2001241910 A * | 9/2001 |
| JP | 2002-009710 | 1/2002 |
| JP | 2002-314920 | 10/2002 |
| JP | 2003-163644 | 6/2003 |
| JP | 2004-282733 | 10/2004 |

OTHER PUBLICATIONS

Franz Gisin et al., "Analysis of the Measurement Uncertainty Associated with 1/R Extrapolation of Radiated Emission Measurements on an Open Area Test Site (OATS)"; IEEE Int Symp Electromagn Compat, vol. 1; pp. 137-140; 1998.

H. Hashimoto et al.; "Range Meter Using M-Sequence Bar Cord for a Marker"; J. Adv. Sci., vol. 12, No. 1/2; pp. 144-145; 2000.

Shinji Koyama et al.; "Calculation Program of GPS Positioning"; Technical Research Report of the Institute of Electronics, Information and Communication Engineers; Vo. 101; No. 33 (SANE2001-1-11); pp. 39-44; 2001.

* cited by examiner

| INTENSITY-BOUNDARY DISTANCE [m] | FREQUENCY [MHz] |
|---|---|
| 0.1 | 47.7 |
| 0.2 | 23.9 |
| 0.3 | 15.9 |
| 0.4 | 11.9 |
| 0.5 | 9.5 |
| 0.6 | 8.0 |
| 0.7 | 6.8 |
| 0.8 | 6.0 |
| 0.9 | 5.3 |
| 1 | 4.8 |
| 2 | 2.4 |
| 3 | 1.6 |
| 4 | 1.2 |

| FREQUENCY [MHz] | DISTANCE [m] |
|---|---|
| 1 | 4.77 |
| 2 | 2.38 |
| 3 | 1.59 |
| 4 | 1.19 |
| 5 | 0.95 |
| 6 | 0.8 |
| 7 | 0.68 |
| 8 | 0.6 |
| 9 | 0.53 |
| 10 | 0.48 |
| 15 | 0.32 |
| 20 | 0.24 |
| 30 | 0.16 |
| 40 | 0.12 |

DISTANCE DETECTION SYSTEM

TECHNICAL FIELD

The present invention relates to a distance detection system and is suitably applied to a distance detection system that detects the distance between terminals communicating with each other.

BACKGROUND ART

To date, in distance detection systems, as methods of detecting the distance between terminals implementing wireless communication with each other, distance detection systems have been proposed that are adapted to utilize, for example, the first method (e.g., refer to Non-Patent Documents 1 to 3) in which, utilizing the fact that an electric wave (radiated electromagnetic field) is attenuated in linearly inverse proportion to a distance r, a receiving-side terminal detects the distance between a sending-side terminal and the receiving-side terminal, based on the electric-field intensity of a received signal or the second method (e.g., refer to Non-Patent Document 4) in which, with clock pulses of the terminals being precisely synchronized, the receiving terminal detects the distance, in accordance with a phase shift (delay component) of a pulse signal, or an M-sequence signal, sent from the sending-side terminal.

Non-Patent Document 1. GIDIN F (Silicon Graphics., CA), PANTIC-TANNER Z (San Francisco State Univ., CA): Analysis of the Measurement Uncertainty with 1/R Extapolation of Radiated Emission Measurements on an Open Area Test Site (OATS)., IEEE Int Symp EIelctromagn Compat, OL. 1998, NO. VoL. 1; PAGE. 137-140; 1998

Non-Patent Document 2. HASHIOTO H, YAMAZAKI M (Tokai Univ., Kanagawa, JPN): a distance sensor utilizing an M-sequence barcode as an indicator, J Adv Sci, Vol. 12, NO. 1/2; PAGE. 144-145; 2000

Non-Patent Document 3. Shibutani Akinori, Nakatsugawa Masashi, Umehira Masahiro (NTT Network Innovation Laboratories), Kubota Shuji (NTT Science and Core Technology Laboratory Group): Discussion About High-Precision Distance Detection by Normalized Least Squares Method, Research Report of Information Processing Society of Japan, VOL. 2001, No. 83 (MBL-18 ITS-6); PAGE. 9-14; 2001

Non-Patent Document 4. Koyama Shinji, Shimada Kanzo, Shiba Nobuyuki, Yasuda Akio (Tokyo University of Marine Science and Technology): GPS Positioning Computing Program, Technical Research Report of the Institute of Electronics, Information and Communication Engineers, VOL. 101, No. 33 (SANE2001 1-11); PAGE. 39-44; 2001

However, in a distance detection system that detects a distance by utilizing the first method, there has been a problem in that, because the electric-field intensity of a signal received by a receiving-side terminal is largely affected by various factors such as a distance loss due to electric-wave reflection on the ground, frequency, electric-wave polarization, the altitude of a radiating body, and shapes and directions of transmitting and receiving antennas, the relationship in which an electric wave is attenuated in linearly inverse proportion to a distance is not retained, whereby accuracy of distance detection is deteriorated.

In contrast, in a distance detection system that detects a distance by utilizing the second method, there has been a problem in that, because, in order to keep clock pulses of a sending-side and a reception-side terminal always precisely synchronized, extremely complicated control, e.g., utilizing the GPS (Global Positioning System), and an apparatus for making the clock pulses synchronize with each other are required, a complex configuration is necessary, as a whole of the system.

DISCLOSURE OF THE INVENTION

The present invention has been implemented in consideration of the foregoing issues and proposes a distance detection system that can enhance with a simple configuration the accuracy of distance detection, an electric-field forming apparatus, an electric-field forming method, an electric-field receiving apparatus, and an electric-field receiving method.

In order to solve the issues, in the present invention, in a distance detection system configured of an electric-field forming apparatus and an electric-field receiving apparatus, quasi-electrostatic-field forming means for forming quasi-electrostatic fields, in such a way that a predetermined intensity can be obtained at the respective positions corresponding to a plurality of frequencies, is provided in the electric-field forming apparatus, and distance detection means for detecting a distance, based on the frequency of the quasi-electrostatic field received by the electric-field receiving apparatus, is provided in the electric-field forming apparatus or an electric-field receiving apparatus.

Accordingly, because in the distance detection system, the electric-field forming apparatus forms quasi-electrostatic fields in which a distance is extremely clearly reflected in intensity, in such a way that a predetermined intensity can be obtained at the positions having respective distances corresponding to a plurality of frequencies, neither complicated control nor a special apparatus is required, whereby it is possible to enhance the accuracy in distance detection based on the frequency of a quasi-electrostatic field received in the electric-field receiving apparatus.

Moreover, in the present invention, quasi-electrostatic-field forming means for forming quasi-electrostatic fields in such a way that a predetermined intensity is obtained at respective distances corresponding to a plurality of frequencies is provided in the electric-field forming apparatus.

In consequence, because the electric-field forming apparatus forms quasi-electrostatic fields in which a distance is extremely clearly reflected in intensity, in such a way that a predetermined intensity can be obtained at the positions having respective distances corresponding to a plurality of frequencies, neither complicated control nor a special apparatus is required, whereby it is possible to enhance the accuracy in distance detection based on the frequency of a quasi-electrostatic field received at the receiving side.

Moreover, in the present invention, a quasi-electrostatic-field forming step of forming quasi-electrostatic fields in such a way that a predetermined intensity is obtained at respective distances corresponding to a plurality of frequencies is provided in an electric-field forming method.

In consequence, because, in the electric-field forming method, quasi-electrostatic fields in which a distance is extremely clearly reflected in intensity are formed in such a way that a predetermined intensity can be obtained at the positions having respective distances corresponding to a plurality of frequencies, neither complicated control nor a special apparatus is required, whereby it is possible to enhance the accuracy in distance detection based on the frequency of a quasi-electrostatic field received at the receiving side.

Still moreover, in the present invention, in an electric-field receiving apparatus provided on a moving subject, receiving means for receiving quasi-electrostatic fields formed in such a way that a predetermined intensity can be obtained at the respective positions corresponding to a plurality of frequencies, and distance detection means for detecting a distance, based on the frequency of the quasi-electrostatic field received by the receiving means, are provided.

In consequence, with the electric-field forming apparatus, because quasi-electrostatic fields in which a distance is extremely clearly reflected in intensity are formed in such a way that a predetermined intensity can be obtained at the positions having respective distances corresponding to a plurality of frequencies, neither complicated control nor a special apparatus is required, whereby it is possible to enhance the accuracy in distance detection based on the frequency of the received quasi-electrostatic field.

Still moreover, in the present invention, in an electric-field receiving method for an electric-field receiving apparatus provided on a moving subject, receiving means for receiving quasi-electrostatic fields formed in such a way that a predetermined intensity can be obtained at the respective positions corresponding to a plurality of frequencies, and distance detection means for detecting a distance, based on the frequency of the quasi-electrostatic field received by the receiving means, are provided.

In consequence, with the electric-field forming method, because quasi-electrostatic fields in which a distance is extremely clearly reflected in intensity are formed in such a way that a predetermined intensity can be obtained at the positions having respective distances corresponding to a plurality of frequencies, neither complicated control nor a special apparatus is required, whereby it is possible to enhance the accuracy in distance detection based on the frequency of the received quasi-electrostatic field.

Figure 1:
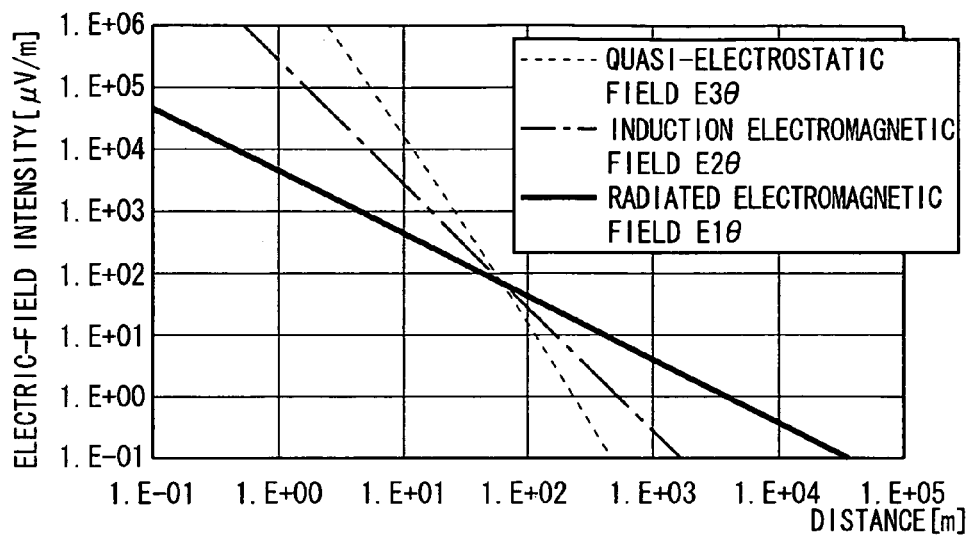
FIG. 1 is a graph representing relative intensity versus distance, for each electric field.

BEST MODE FOR CARRYING OUT THE INVENTION (1) Outline of the Present Invention

In the present invention, information is transmitted and received through vicinity communication (referred to as near-field communication, hereinafter) utilizing a quasi-electrostatic field. The outline of the present invention will be explained below, in relationship to the nature of the quasi-electrostatic field.

(1-1) Quasi-Electrostatic Field

In general, in the case where a current is made to flow through an electric dipole (dipole antenna), the electric field radiated by the dipole antenna is given by the following equations, in accordance with the equations related to (referred to as Maxwell's equations, hereinafter) electric fields, referred to as Maxwell:

$$E_r = \frac{A\cos\omega t \cdot \cos\theta}{2\pi\varepsilon r^3} \cdot (1 + jkr) \cdot \exp(-jkr) \quad (1)$$

$$E_\theta = \frac{A\cos\omega t \cdot \sin\theta}{4\pi\varepsilon r^3} \cdot (1 + jkr + (jkr)^2) \cdot \exp(-jkr)$$

where "cos ωt" denotes the oscillation of an electric charge; "A", a constant (a coefficient corresponding to an output) including the electric-charge amount of two oscillating electric charges and the distance between the two electric charges; "θ", an angle from the center of the dipole antenna; "r", a distance from the center of the dipole antenna (unit: [m]); "∈", a dielectric constant; "j", an imaginary number; and "k" denotes a wave number (unit: [1/m]).

In addition, among electric fields expressed by Equation (1), components $E_{1r}$, $E_{1\theta}$ that are in linearly inverse proportion to a distance (referred to as radiated electromagnetic fields, hereinafter) are given by the following equations:

$$E_{1r} = 0 \quad (2)$$

$$E_{1\theta} = \frac{A\cos\omega t \cdot \sin\theta}{4\pi\varepsilon r_3} \cdot (jkr)^2 \cdot \exp(-jkr)$$

Moreover, components that are inverse proportion to a distance raised to the second power (referred to as induction electromagnetic fields, hereinafter) are given by the following equation:

$$E_{2r} = \frac{A\cos\omega t \cdot \cos\theta}{2\pi\varepsilon r^3} \cdot (jkr) \cdot \exp(-jkr) \qquad (3)$$

$$E_{2r} = \frac{A\cos\omega t \cdot \sin\theta}{4\pi\varepsilon r^3} \cdot (jkr) \cdot \exp(-jkr)$$

Still moreover, components that are inverse proportion to a distance raised to the third power $E_{2r}$ and $E_{2\theta}$ (referred to as quasi-electrostatic fields, hereinafter) are given by the following equation:

$$E_{3r} = \frac{A\cos\omega t \cdot \cos\theta}{2\pi\varepsilon r^3} \cdot \exp(-jkr) \qquad (4)$$

$$E_{3\theta} = \frac{A\cos\omega t \cdot \sin\theta}{4\pi\varepsilon r^3} \cdot \exp(-jkr)$$

When, with regard to Maxwell's equations applied to the dipole antenna, the respective relative relationships between the intensity and the distance, of the radiated electromagnetic field, the induction electromagnetic field, and the quasi-electrostatic field are graphed, FIG. 1 is obtained as a result. In this regard, however, in FIG. 1, the relative intensity, at frequency of 1 [MHz], of each electric field is substituted by an exponent (exponential scale) to be qualitatively represented.

As is clear from FIG. 1, it can be seen that there is a distance (referred to as an intensity-boundary distance, hereinafter) at which the radiated electromagnetic field, the induction electromagnetic field, and the quasi-electrostatic field are the same in intensity; at a position having a distance longer than the intensity-boundary distance, the radiated electromagnetic field becomes dominant; in contrast, at a position having a distance shorter than the intensity-boundary distance, the quasi-electrostatic field becomes dominant.

According to an equation related to an electric-field intensity, obtained from Maxwell's equations, the intensity-boundary distance is a distance r in the case where the following equation is satisfied.

$$k \cdot r = 1 \qquad (5)$$

Assuming that the light velocity and frequency are denoted by c (c=3×10⁸ [m/s]) and f, respectively, the wave number k in Equation (5) is in a relationship, given by the following equation, with c and f:

$$k = \frac{2\pi f}{c} \qquad (6)$$

Arranging Equations (5) and (6) yields the following equation:

$$r = \frac{c}{2\pi f} \qquad (7)$$

Figure 2:
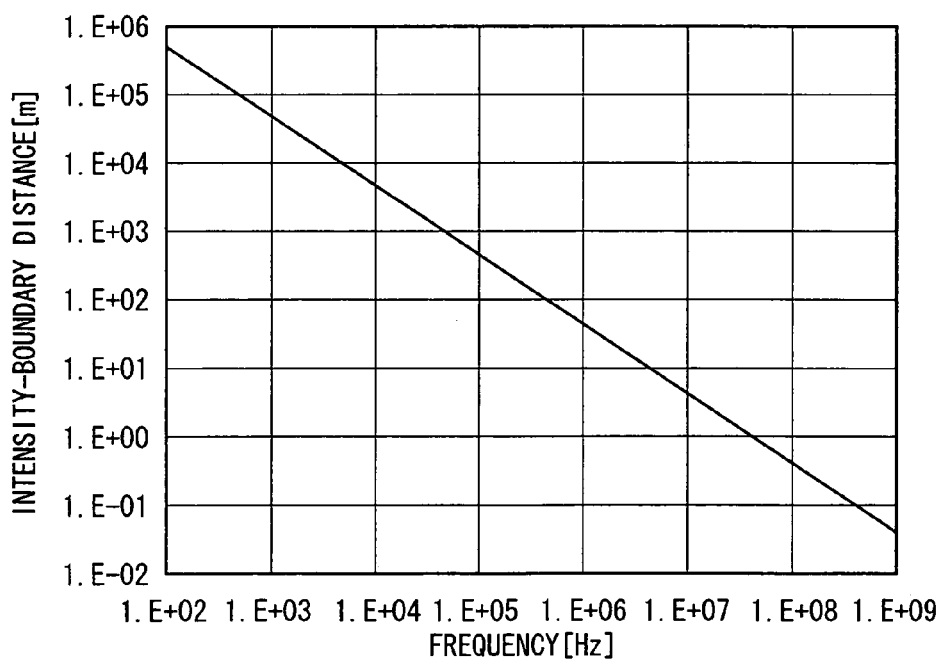
FIG. 2 is a graph representing the relationship between intensity-boundary distance and frequency.

As is clear from FIG. 2, according to Equation (7), the intensity-boundary distance r is uniquely determined in accordance with the frequency f.

Figure 3:
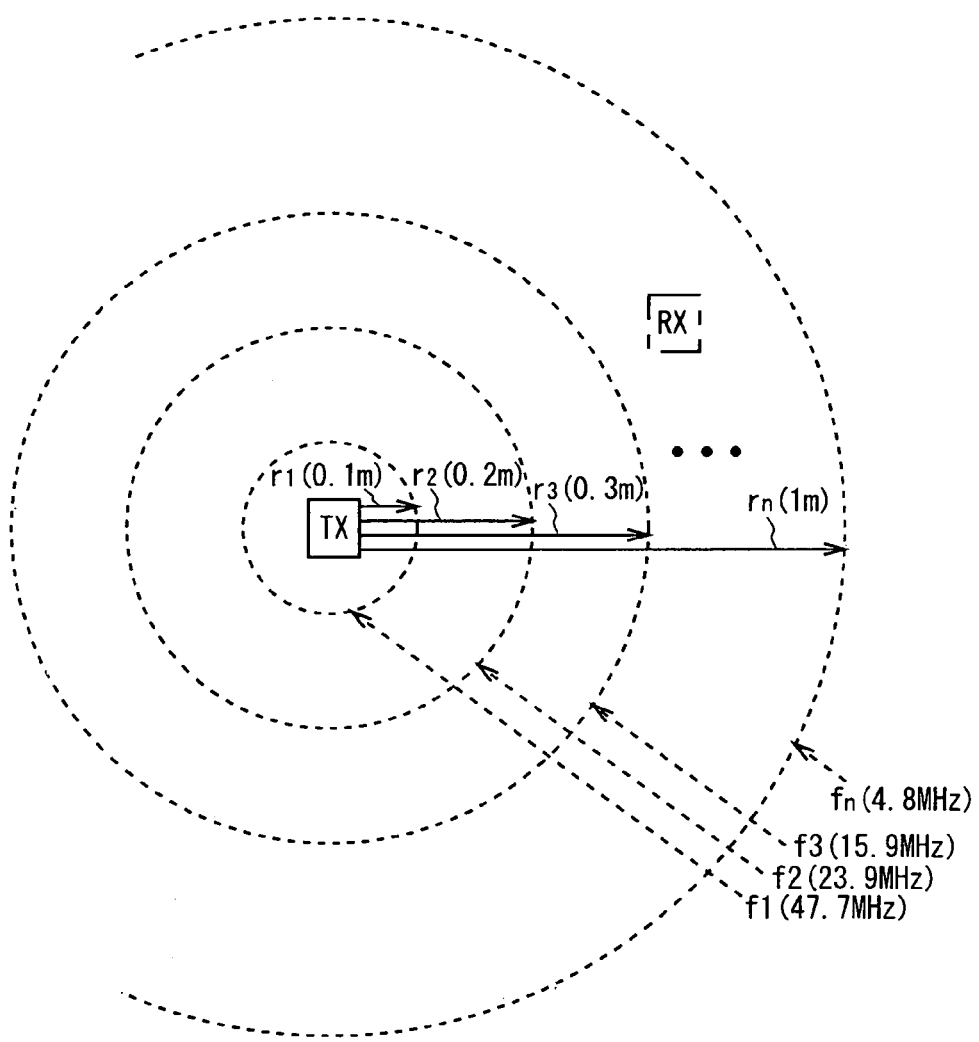
FIG. 3 is a chart schematically representing quasi-electrostatic fields oscillating at respective frequencies.

Accordingly, as represented in FIG. 3, with a plurality of intensity-boundary distances r1 to rn being set with respect to a transmission terminal TX, if frequencies f1 to fn are selected so as to satisfy Equation (7), in accordance to the intensity-boundary distances r1 to rn, a plurality of spaces can be formed in which corresponding quasi-electrostatic fields (represented by broken lines in FIG. 3) oscillating at the respective frequencies f1 to fn are dominant.

Therefore, at the transmission terminal TX (in FIG. 3), by adjusting the output powers for the frequencies f1 to f(n−1) (47.7 [MHz], 23.9 [MHz], 15.9 [MHz]) so that the electric-field intensities at the frequencies f1 to f(n−1) are the same as that at the frequency fn (4.8 [MHz]), which is the lowest frequency among the frequencies f1 to fn selected so as to satisfy Equation (7), in accordance with the respective intensity-boundary distances r1 to rn, a plurality of spaces can be formed in which corresponding quasi-electrostatic fields oscillating at the respective frequencies f1 to fn are dominant. In this case, at the reception terminal RX, it is possible to detect the distance between the transmission terminal TX and the reception terminal RX, based on the frequency of the received quasi-electrostatic field.

In addition, with regard to the adjustment of output power, if it is defined that Ai denotes a coefficient (referred to as an output-power adjusting coefficient, hereinafter) for adjusting the output power, the absolute value $E_i$ of the θ-direction-component electric-field intensity $E_\theta$ and the r-direction-component electric-field intensity $E_r$, at a position located at the intensity-boundary distance ri, for the frequency fi is given by the following equation:

$$E_i = \left| \frac{Ai\sin^2\theta + 4\cos^2\theta}{4\pi\varepsilon} \cdot \left[\frac{2\pi f_i}{c}\right]^3 \cdot \exp(-j) \right| \qquad (8)$$

Thus, based on Equation (8), the output-power adjusting coefficient Ai can be obtained, with which, at a position located at the intensity-boundary distance ri corresponding to each frequency fi, the electric-field intensity $E_i$ becomes a predetermined level E*:

$$A_i = \left| \frac{E* \cdot 4\pi\varepsilon}{\sqrt{\sin^2\theta + 4\cos^2\theta}} \cdot \left[\frac{c}{2\pi f_i}\right]^3 \cdot \exp(i) \right| \qquad (9)$$

Accordingly, at the transmission terminal TX (in FIG. 3), the output power for each of the frequencies f1 to f(n−1) (47.7 [MHz], 23.9 [MHz], 15.9 [MHz]) can be adjusted, by utilizing Equation (9).

As discussed above, in the case where a plurality of spaces are formed in which the quasi-electrostatic fields are securely dominant, the spaces are characterized in that, due to being inverse proportion to a distance raised to the third power, the respective quasi-electrostatic fields for the frequencies f1 to fn are extremely clearly reflected in the intensity-boundary distances r1 to rn, in comparison to the radiated electromagnetic field and the induction electromagnetic field.

Figure 4:
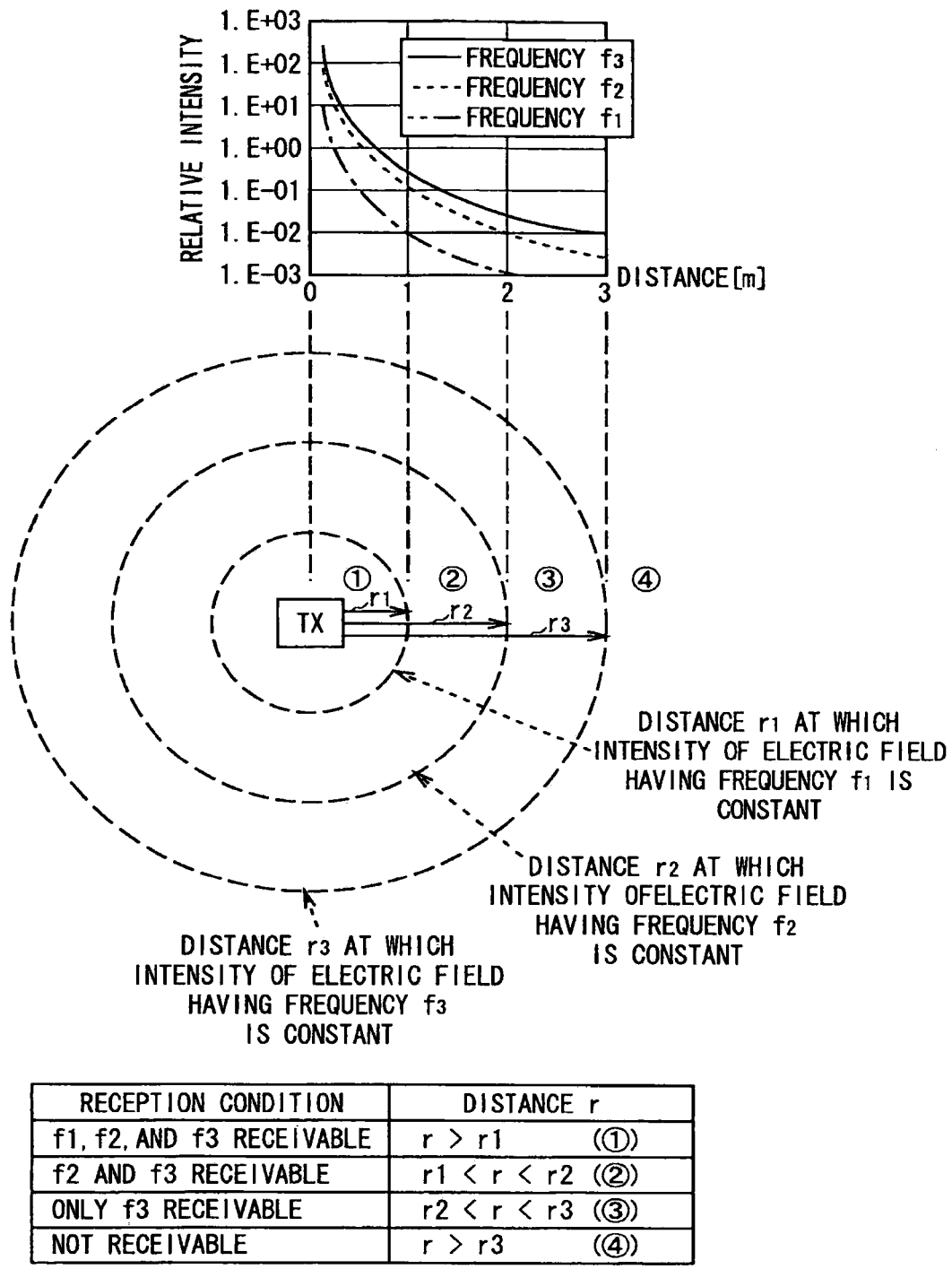
FIG. 4 is a combination of diagrams and a table schematically representing the relationship between reception condition and distance.

By paying attention to the characteristics, as represented in FIG. 4, it can be seen from the diagrams and the table that, in the case where a reception terminal RX that can receive a signal having electric-field intensity of not less than the predetermined level E* (referred to as an electric-field signal, hereinafter) exists in the vicinity of a transmission terminal TX, the more the number of the frequencies f1 to f3 that the reception terminal receives is, the shorter the distance between the reception terminal RX and the transmission terminal TX is. Accordingly, in accordance with the number of received frequencies f1 to f3, the reception terminal RX can precisely determine the distance, at the timing of reception, between the transmission terminal TX and the reception terminal RX.

As discussed above, in the present invention, at the sending side, by adjusting the output powers for the frequencies f1 to f(n−1) so that the electric-field intensities at the frequencies f1 to f(n−1) are the same as that at the frequency fn, which is the lowest frequency among the frequencies f1 to fn selected so as to satisfy Equation (7), in accordance with the respective intensity-boundary distances r1 to rn, a plurality of spaces is formed in which corresponding quasi-electrostatic fields oscillating at the respective frequencies f1 to fn are dominant; then, at the reception side, in accordance with the number of the frequencies f1 to f3 that the reception side receives, the distance, at the timing of reception, between the transmission terminal TX and the reception terminal RX is determined.

(1-2) Quasi-Electrostatic Field and Human Body

Meanwhile, when a human body is made to generate a radiated electromagnetic field or an induction electromagnetic field, it is necessary to make an electric current flow through the human body; however, a human body has a significantly high impedance, whereby making an electric current flow efficiently through the human body is physically difficult and not preferable in terms of physiology. However, static electricity has entirely different conditions.

In other words, as an empirical fact that we usually feel static electricity indicates, a human body is very readily charged. In addition, it is well known that charging, on the surface of a human body, due to a bodily movement generates a quasi-electrostatic field; therefore, in order to make a human body generate a quasi-electrostatic field, it is not necessary to make an electric current flow through a human body, but charging on the surface of a human body may be implemented.

In other words, a human body is charged through the movement of an extremely small number of electric charges, and the change in the electric charges instantaneously propagates in the surrounding area on the surface of the human body, thereby forming in approximately the same direction an equipotential surface of a quasi-electrostatic field; in a space in which a quasi-electrostatic field is dominant, a radiated electromagnetic field and an induction electromagnetic field scarcely affect the space, whereby the human body efficiently functions as an antenna. This fact has already been ascertained through the results of an experiment by the present applicant.

In the present invention, at a sending side, by charging a human body in accordance with a signal modulated by predetermined information, thereby forming a quasi-electrostatic field that has information isotropically toward the surrounding in the vicinity of the human body, the information is transmitted (appropriately referred to as human-body-antenna transmission, hereinafter); at a reception side, by detecting the change in the intensity of the quasi-electrostatic field having the information, thereby receiving (appropriately referred to as human-body-antenna reception, hereinafter) and demodulating the quasi-electrostatic field, the information is obtained.

(1-3) Quasi-Electrostatic Field and Walking Movement of Human Body

As described already, the surface of a human body is charged according to movement of the human body; the relationship between the charging and walking, which is one of the major movements of a human body, will be described in more detail.

In other words, the displacement of the intensity of the quasi-electrostatic field (referred to as a walking quasi-electrostatic field, hereinafter) formed through the charging on the surface of a human body, due to a walking movement of the human body, tightly involves not only transfer, of an electric charge, between the road surface and the plantar surface, but also change in the detachment area (or contact area) of the plantar surface, with respect to the road surface and change in the distance between the road surface and the plantar surface.

In other words, the change in charging on the surface of a human body, due to a walking movement of the human body, is caused by change, in the electrostatic capacitance between a foot and a road surface, that corresponds to the foot trajectory made by the walking movement, and by change in electric charge, and reflects the pattern, inherent to an individual, that is combined with mutual movement between both the left and the right foot.

Meanwhile, at the instant when the toe of the right foot (left foot) is completely detached from the road surface, as characteristics of a walking mode, regardless of the difference in the characteristics of a walking mode, the left foot (right foot) is completely attached to the surface of the road.

Accordingly, in this condition, no charging interaction (interferential action) between the left and the right foot occurs; the displacement of the intensity of the walking quasi-electrostatic field, in this condition, emerges within the bandwidth of 8±2 [Hz], as the peak of a largest-amplitude wave.

In the present invention, by utilizing as an indicator the peak (referred to as an 8 Hz peak, hereinafter), of a largest-amplitude wave, that occurs when the change in charging on the surface of a human body, due to a walking movement of the human body, uniquely emerges, a walking speed of a human body is measured, or identification processing is implemented based on the displacement, of the intensity, that emerges between the 8 Hz peaks, as an inherent pattern of an individual.

For reference's sake, with regard to the detail of the 8 Hz peak, refer to Japanese Patent Application No. 2002-314920 (p. 5, to p. 12, [0056]) that has been already disclosed by the present applicant.

As described above, the outline of the present invention utilizing a quasi-electrostatic field or the nature of a human body has been described item by item; one embodiment, described in the items, to which the present invention is applied will be explained below in detail.

In addition, the one embodiment below is considered one of the methods that are effective to solve problems related to the autonomous distributed wireless network (so-called ad hoc network).

(2) One Embodiment of the Present Invention (2-1) Overall Configuration of Distance Detection System 1

Figure 5:
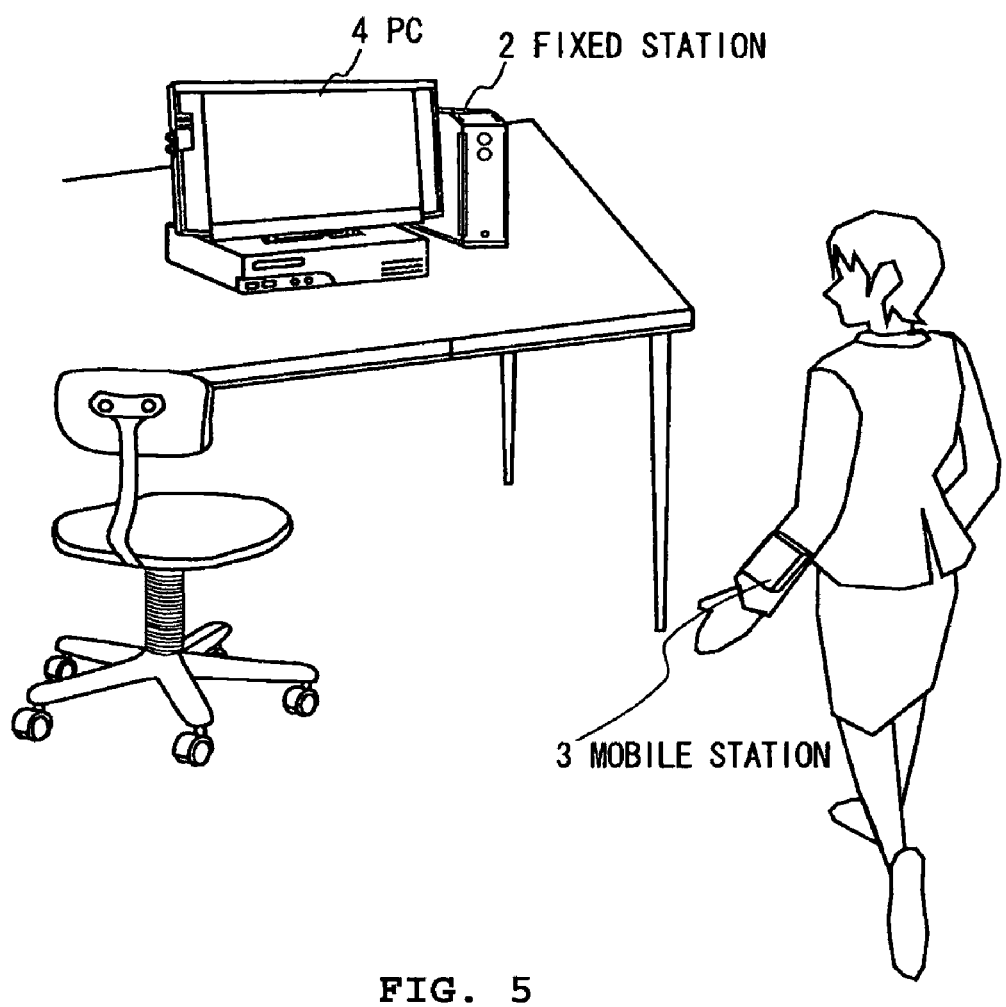
FIG. 5 is a view schematically illustrating an overall configuration of a distance detection system.

In FIG. 5, Reference numeral 1 denotes a distance detection system as a whole, according to the present embodiment; the distance detection system is configured of a stationary wireless communication apparatus (referred to as a fixed station, hereinafter) 2 and a transportable wireless communication apparatus (referred to as a mobile station, hereinafter) 3.

The fixed station 2 is connected to a personal computer (referred to as a PC, hereinafter) 4 to be controlled by the fixed station 2. Meanwhile, the mobile station 3 is arranged on the body of a human (referred to as a user, hereinafter) who utilizes the PC 4, for example, on the arm (the point is that the mobile station 3 is in the vicinity of the user, such as within a pocket of clothing or inside a bag possessed by the user). The fixed station 2 and the mobile station 3 communicate with each other to implement near-field communication.

Figure 6:
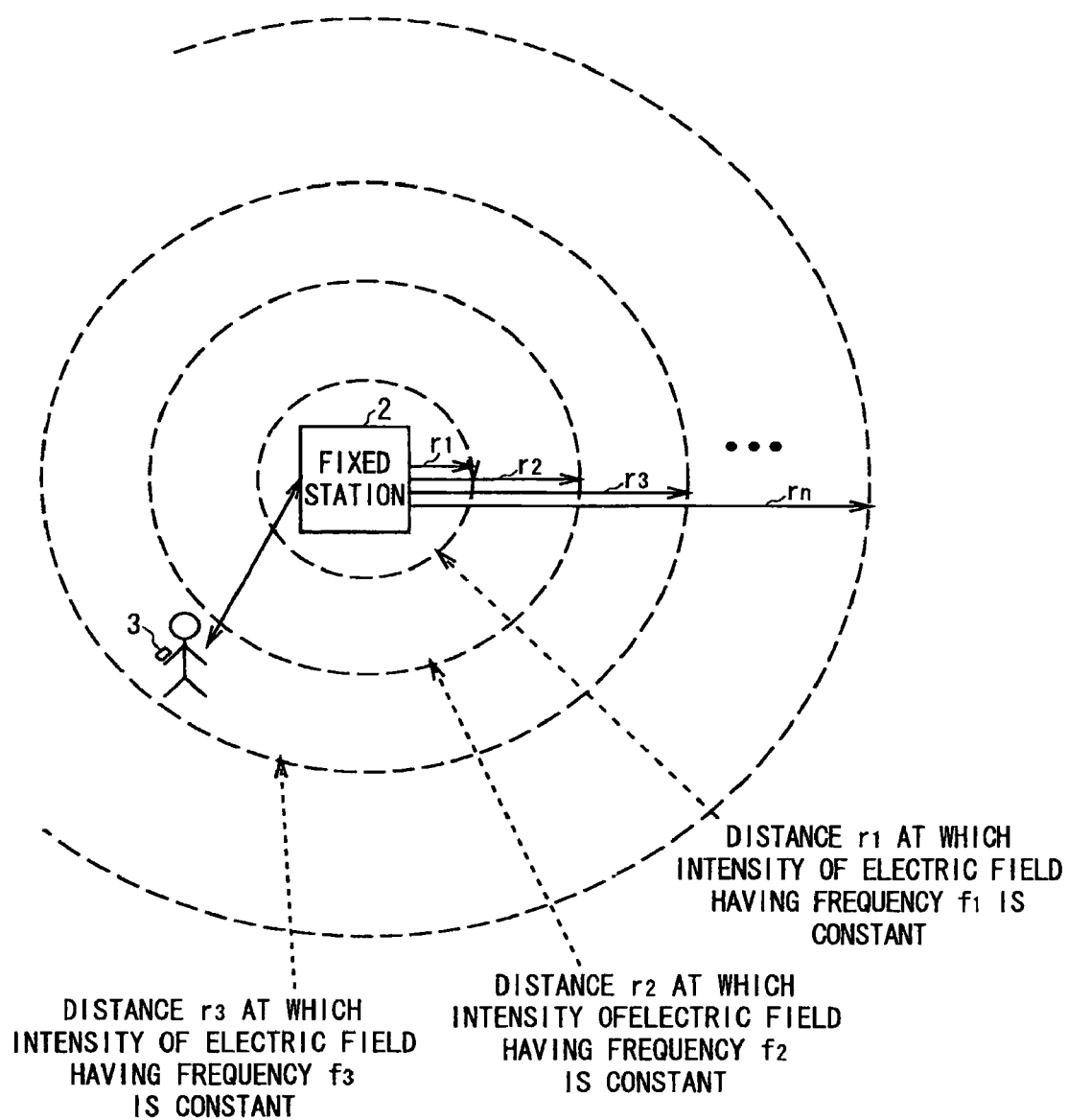
FIG. 6 is a chart schematically representing quasi-electrostatic fields formed at a fixed station.

Specifically, at the fixed station 2, as represented in FIG. 6 for example, as distances at which the near-field communication is implemented, a plurality of intensity-boundary distances r1 to rn that are each different from one another, with respect to the fixed station 2, is set; frequencies f1 to fn of signals to be transmitted are selected so as to satisfy Equation (7), in accordance to the r1 to rn.

In addition, at the fixed station 2, as described with reference to FIG. 3, by adjusting the output powers of the signals having the frequencies f1 to f(n−1), by means of Equation (9), so that the electric-field intensities of the signals having the frequencies f1 to f(n−1) are the same as the electric-field intensity E* of the signal having the frequency fn, which is the lowest frequency among the frequencies f1 to fn of each signal, a plurality of spaces in which corresponding quasi-electrostatic fields oscillating at the respective frequencies f1 to fn are dominant is formed.

Figures 7A, 7B:
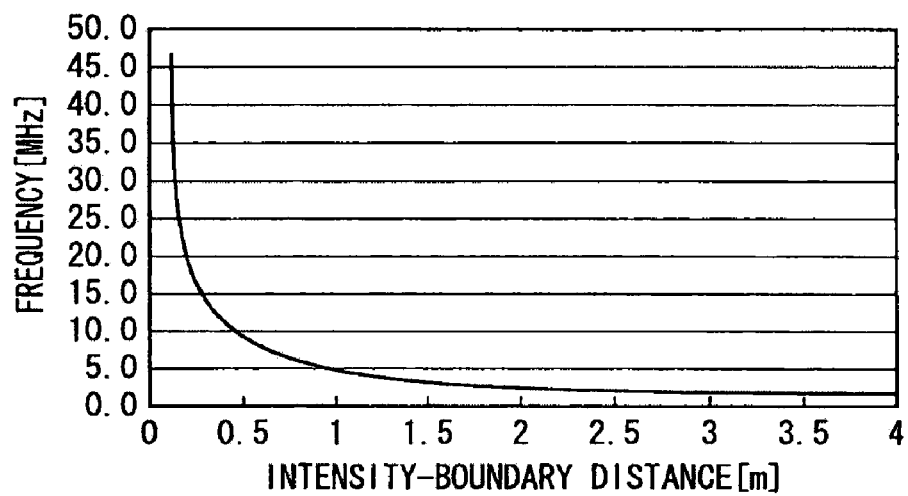
FIGS. 7A and 7B are a table and a graph, respectively, representing the relationship between intensity-boundary distance and frequency.

For example, at the fixed station 2, the frequencies are selected so as to each correspond to the intensity-boundary distance as represented in FIG. 7A; with a relationship between the intensity-boundary distance and the corresponding frequency, a plurality of quasi-electrostatic fields having the intensities as represented in FIG. 7B can be formed. For reference's sake, in FIGS. 7A and 7B, as the receiving sensitivity at the mobile station 3, the frequencies are selected on the assumption that the difference between the intensity of the weakest among the quasi-electrostatic fields that are receivable and the intensity of the weakest among the radiated electromagnetic fields that are receivable is 20 [dB].

Meanwhile, the mobile station 3 receives from the user the frequency, of a quasi-electrostatic field, that changes in accordance with the respective frequencies of the plurality of quasi-electrostatic fields into which the user enters, and detects, in the same way as described with reference to FIG. 4, the distance between the mobile station 3 and the fixed station 2 (referred to as a transmission/reception distance, hereinafter), based on the frequency of the received quasi-electrostatic field. In this situation, the mobile station 3 computes the walking speed of the user (referred to as a user's walking speed, hereinafter) based on the charged condition (change in intensity), of the user, that changes in accordance with the frequency of the quasi-electrostatic field, and implements a predetermined identification processing.

Thereafter, when, as a result of the identification processing, obtaining a result that the user is an authentic user, the mobile station 3 creates as the current (at the timing when the charged condition has been detected) information on the user (referred to as a user's information item, hereinafter) the ID and password for the PC 4 (referred to as a user's ID, hereinafter) that has been preliminarily stored in an internal memory, the user's walking speed, and the transmission/reception distance, and transmits the user's information item through a human-body antenna.

In this case, the fixed station 2 receives through the human-body antenna and then demodulates the user's information item transmitted through the human-body antenna from the mobile station 3, thereby obtaining the user's information item, estimates based on the obtained user's information item the moving condition of the mobile station 3, and controls the PC 4 based on the result of the estimation.

As described above, in the distance detection system 1, the user's information item is mutually communicated, through the near-field communication, between the user approaching to the PC 4, i.e., the mobile station 3 and the fixed station 2; before the mobile station 3 (the user) reaches the PC 4, the PC 4 is activated; then, as may be necessary, the user logs in the PC 4.

(2-2) Configuration of the Fixed Station 2

Figure 8:
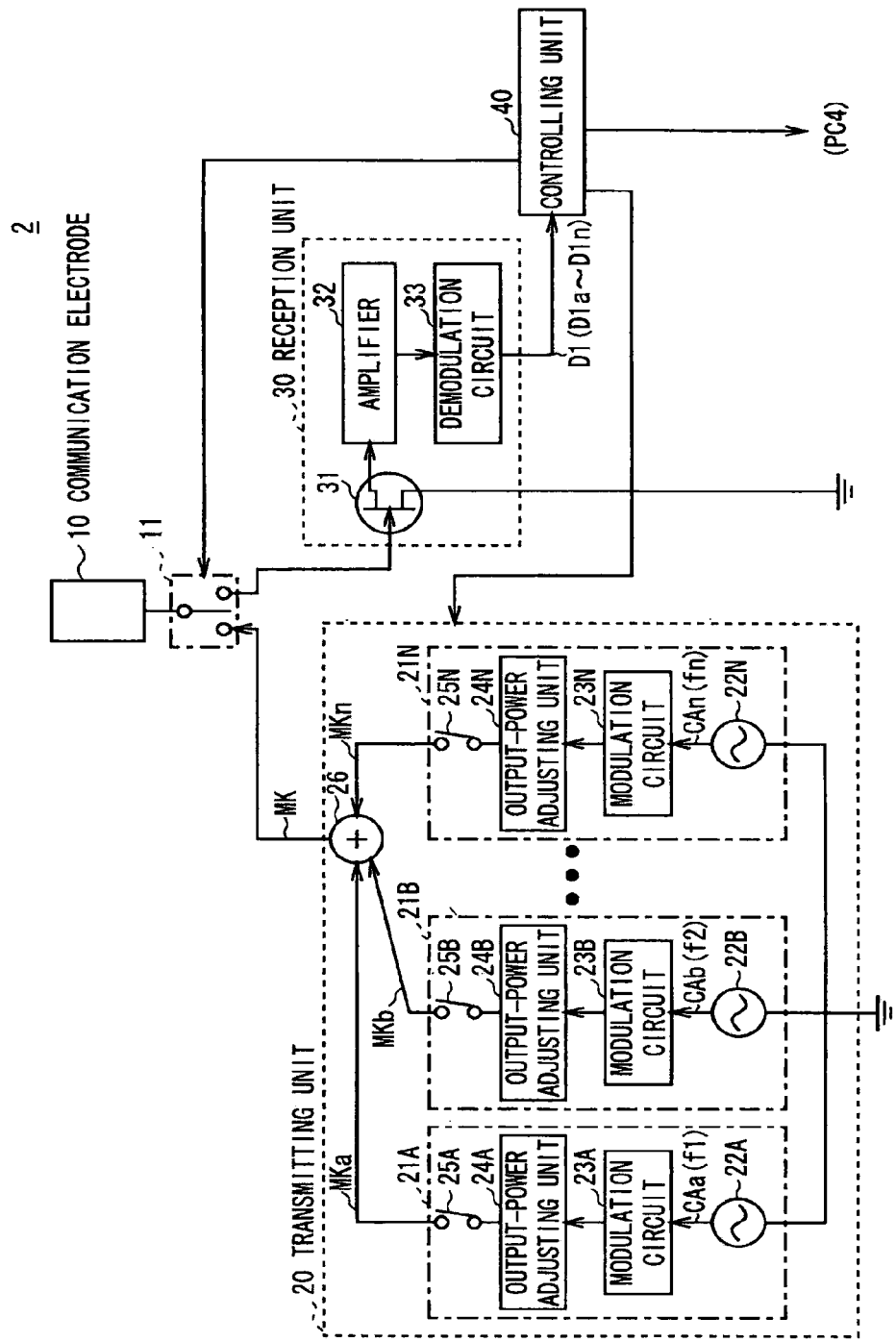
FIG. 8 is a block diagram schematically illustrating a configuration of a fixed station.

As represented in FIG. 8, the fixed station 2 is configured of a communication electrode 10, a transmission/reception switch 11, a transmitting unit 20, a reception unit 30, and a controlling unit 40.

The transmitting unit 20 includes a plurality of transmission processing units 21A to 21N that each operate independently; a plurality of oscillators 22A to 22N is provided in the respective transmission processing units 21A to 21N.

In this case, the oscillators 22A to 22n are selected that generate carrier-wave signals CAa to CAn having frequencies f1 to fn that satisfy Equation (7), in accordance with a plurality of preset intensity-boundary distances r1 to rn.

The transmission processing units 21A to 21N frequency-modulate through modulation circuits 23A to 23N the carrier-wave signals CAa to Can, in accordance with indication information, adjust through output-power adjusting units 24A to 24N the output powers, and transmit as indication-wave signals MKa to Mkn the adjusted carrier-wave signals to a synthesizer 26, through selection switches 25A to 25N.

In this case, the output-power adjusting units 24A to 24($n$−1) other than the output-power adjusting unit 24N corresponding to the carrier-wave signal CAn having the lowest frequency fn adjust in accordance with Equation (9) the output powers corresponding to the carrier-wave signals CAa to CA(n−1) so that the electric-field intensities of the carrier-wave signals CAa to CA(n−1) are the same as that at the frequency fn.

The synthesizer 26 synthesizes the indication-wave signals MKa to MKn and applies through the transmission/reception switch 11 the resultant synthesized indication-wave signal MK to the communication electrode 10. In consequence, a plurality of quasi-electrostatic fields (in FIG. 6) oscillating at a plurality of frequencies f1 to fn is formed through the communication electrode 10.

As described above, the transmitting unit 20 forms spaces in which a plurality of quasi-electrostatic fields oscillating at the frequencies f1 to fn corresponding to the respective indication-wave signals MKa to MKn is dominant. Accordingly, the mobile station 3 is adapted to be able to receive the quasi-electrostatic field oscillating at the frequency corresponding to the distance between the mobile station 3 and the fixed station 2 (i.e., the location of the mobile station 3).

The reception unit 30 detects (receives through a human-body antenna) sequentially through the communication electrode 10, the transmission/reception switch 11, and the gate of a FET 31 the change, in the intensity of the quasi-electrostatic field, that is formed in the vicinity of the user by the mobile station 3 (3a to 3n) when the user enters each quasi-electrostatic field, amplifies through an amplifier 32 and demodulates through a demodulation circuit 33 the change in the intensity, and then transmits the resultant user's information item D1 (D1$a$ to D1$n$) to the controlling unit 40.

The controlling unit 40 includes an unillustrated CPU (Central Processing Unit), a work memory, and an information-storage memory, and after, under the control of the CPU, reading out onto the work memory a predetermined control program stored in the information-storage memory, implements control processing. In addition to the control program, various kinds of information are stored in the information-storage memory.

Figure 9:
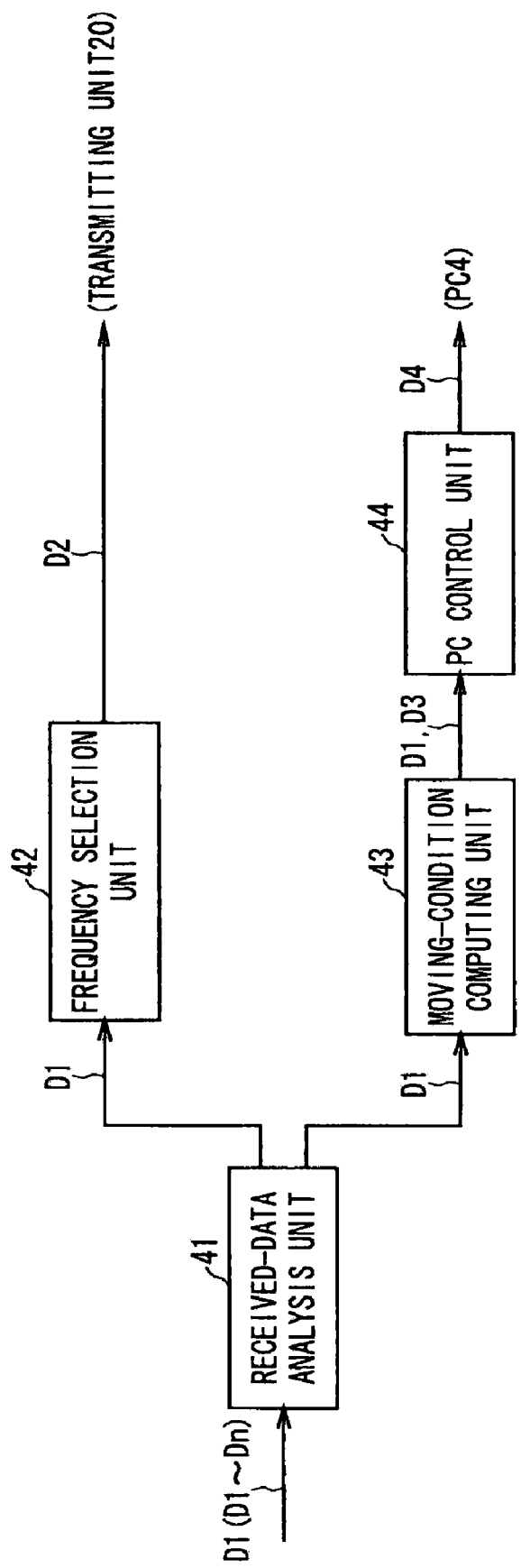
FIG. 9 is a block diagram illustrating processing by a controlling unit in a fixed station.

Here, as illustrated in FIG. 9, the contents of the control processing in the controlling unit 40 can be divided, from the viewpoint of a function, into a received-data analysis unit 41 for detecting the user's information item D1 forwarded from the reception unit 30, a frequency selection unit 42 for determining based on the user's information item D1 detected by the received-data analysis unit 41 the frequency to be used (i.e., the frequencies f1 to fn of the indication-wave signals MKa to MKn outputted from the transmitting unit 20), a moving-condition computing unit 43 for computing based on the user's information item D1 the moving condition of the mobile station 3, and a PC control unit 44 for controlling the PC 4, based on the result of the computation by the moving-condition computing unit 43. Each processing of the received-data analysis unit 41, the frequency selection unit 42, the moving-condition computing unit 43, and the PC control unit 44 will be explained below.

(2-2-1) Processing by the Received-Data Analysis Unit 41

The received-data analysis unit 41 is adapted to periodically detects user's information item D1 (a user's ID, a user's walking speed, and a transmission/reception distance) forwarded from the reception unit 30; in the case where the result of the detection indicates a single number (i.e., in the case where only one mobile station 3 exists in a plurality of quasi-electrostatic fields formed by the fixed station 2), the received-data analysis unit 41 sends out the detected user's information item D1 directly to the frequency selection unit 42 and the moving-condition computing unit 43.

In contrast, in the case where the result of the detection indicates a plural number (i.e., in the case where, a plurality of mobile stations 3a to 3n exist in a plurality of quasi-electrostatic fields formed by the fixed station 2), by comparing each of the transmission/reception distances of a plurality of user's information items D1a to D1n with one another, the received-data analysis unit 41 identifies the user's information item D1 (D1a, D1b, . . . , or D1n) that indicates the minimal transmission/reception distance, as the user's information item D1 transmitted through a human-body antenna from the mobile station 3 nearest to the fixed station 2, and then sends out the user's information item D1 to the frequency selection unit 42 and the moving-condition computing unit 43.

In this case, the received-data analysis unit 41 considers as a comparison subject the transmission/reception distance based on the frequency f, received at the position where the mobile station 3 exists, among the frequencies f1 to fn that are uniquely determined in accordance with the intensity-boundary distances r1 to rn with respect to the fixed station 2; therefore, the user's information item D1 transmitted through a human-body antenna from the mobile station 3 nearest to the fixed station 2 can be identified with high accuracy, through simple processing in which the transmission/reception distances are compared.

(2-2-2) Processing by the Frequency Selection Unit 42

The frequency selection unit 42 preliminarily stores in the information-storage memory a table in which the intensity-boundary distances r1 to rn are related to the respective frequencies f1 to fn (referred to as a frequency/distance conversion table, hereinafter), and selects the frequency to be utilized, based on the frequency/distance conversion table and the transmission/reception distance of the user's information item D1 forwarded from the received-data analysis unit 41.

Specifically, as is the case with the diagrams and the table represented in FIG. 4, letting d denote the transmission/reception distance of the user's information item D1, the frequency selection unit 42 obtains k (k=2, 3, . . . , n) that satisfies the following equation, and then selects the frequencies f1 to fk.

$$r_{k-1} < d < r_k \text{ (wherein, } k=1, 2, \ldots n)\tag{10}$$

Thereafter, the frequency selection unit 42 creates an output control data D2 for making, for example, only the indication-wave signals MKa to MKc, corresponding to the frequencies f1 to f3 for example, among the frequencies f1 to fn that have been selected as described above, to be outputted, and sends out the output control data D2 to the transmitting unit 20.

In this situation, in the transmitting unit 20, the selection switches 25D to 25N other than the selection switches 25A to 25C corresponding to the indication-wave signals MKa to MKc are opened through the output control data D2; in consequence, only the respective quasi-electrostatic fields are formed that oscillate at the frequencies f1 to f3 corresponding to the indication-wave signals MKa to MKc, respectively.

As described above, the frequency selection unit 42 is adapted to be able to select the frequencies f1 to fn of the indication-wave signals MKa to MKn to be outputted from the transmitting unit 20, based on the transmission/reception distance of the user's information item D1 (i.e., the location of the mobile station 3).

In consequence, the frequency selection unit 42 is adapted to be able to appropriately avoid in accordance with the location of the mobile station 3 propagation of the quasi-electrostatic fields oscillating at unnecessary frequencies; therefore, power dissipation in the fixed station can be reduced, and unnecessary application of power to the user can be suppressed.

In the present embodiment, the frequency selection unit 42 is adapted to select frequencies f1 to f(k+1) in stead of the frequencies f1 to fk that are selected based on Equation (10), in such a way that a distance that is longer than the transmission/reception distance of the user's information item D1 is covered.

Accordingly, the frequency selection unit 42 is adapted to be able to avoid such a situation that user's (the mobile station 3) rapid movement in a direction receding from the fixed station 2 cuts off communication.

(2-2-3) Processing by Moving-Condition Computing Unit 43

When receiving the user's information item D1 from the received-data analysis unit 41, the moving-condition computing unit 43 creates time-instant information from the time instant at which the user's information item has been received, and stores in the information-storage memory that time-instant information along with the corresponding user's information item, or updates the contents of the information-storage memory.

In this situation, assuming that the mobile station 3 is in a moving condition, the moving-condition computing unit 43 computes the speed of the mobile station 3 with respect to the fixed station 2 (referred to as an approach speed, hereinafter) Va [cm/s] and the angle between the vector of the user's walking speed and the vector of the approach speed (referred to as a movement angle, hereinafter) φ, based on the transmission/reception distance of the user's information item D1 and a user's walking speed.

Specifically, in the first place, letting Nt denote the present time instant at which the user's information item D1 has been received; Nd, the transmission/reception distance of the user's information item D1; Pt, the time instant at which a past user's information item D1 stored in the information-storage memory was received; Pd, the transmission/reception distance of the past user's information item D1; and IDz (z=1, 2, . . . , n), the user's ID of the user's information item D1, the moving-condition computing unit 43 computes, as the following equation, the approach speed Va, in accordance with change in the distance, per unit time, of a mobile station 3:

$$Va(ID_z) = \frac{Nd(ID_z) - Pd(ID_z)}{Nt(ID_z) - Pt(ID_z)} \qquad (11)$$

When being obtained as a positive value, the approach speed Va indicates that the mobile station 3 is approaching the fixed station 2; in contrast, when being obtained as a negative value, the approach speed Va indicates that the mobile station 3 is not approaching (is receding from) the fixed station 2.

Thereafter, letting arccos denote the inverse function of a cosine; and $V_{walk}$, the user's walking speed included in a user's information item D1, the moving-condition computing unit 43 computes a movement angle φ, in accordance with the following equation:

$$\phi = \arccos\left[\frac{V_{walk}(ID_z)}{Va(ID_z)}\right] \qquad (12)$$

Figure 10:
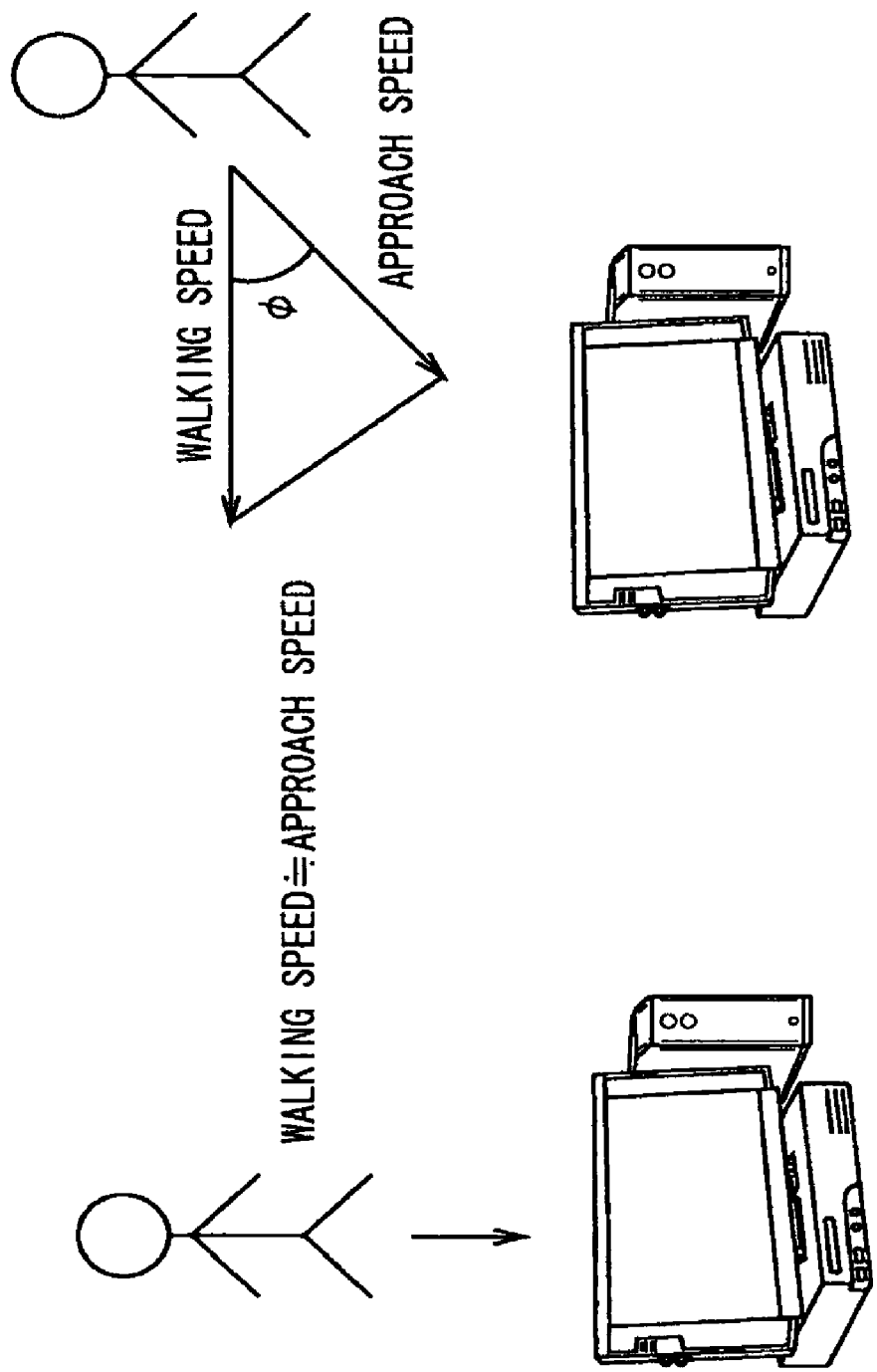
FIG. 10 is a view for schematically explaining computation of a movement angle.

The movement angle φ is the angle between the vectors of a user's walking speed $V_{walk}$ and an approach speed Va; therefore, as illustrated in FIG. 10, it is indicated that the closer to "0°" the movement angle φ is, the more linearly the mobile station 3 is moving to the fixed station 2.

As described above, each time receiving a user's information item D1 from the received-data analysis unit 41, the moving-condition computing unit 43 computes as a moving condition of the mobile station 3 the approach speed Va with respect to the fixed station 2, of the mobile station 3, and the movement angle φ with respect to the line connecting the mobile station 3 and the fixed station 2, of the mobile station 3, and sends out along with the user's information item D1 the result of the computation to the PC control unit 44, as a moving-condition information D3.

(2-2-4) Processing by the PC Control Unit 44

The PC control unit 44 controls the PC 4, based on the user's information item D1 and the moving-condition information D3 that are forwarded from the moving-condition computing unit 43. Specifically, when the approach speed Va of the moving-condition information D3 is a negative value, it is indicated that the mobile station 3 is receding from the fixed station 2, whereby the PC control unit 44 halts the PC 4, through predetermined control data D4.

In contrast, when the approach speed Va of the moving-condition information D3 is a positive value, it is indicated that the mobile station 3 is receding from the fixed station 2, in the case where the approach speed Va is larger than a predetermined threshold value defining that the mobile station 3 (the user) is at a stop (referred to as a threshold speed, hereinafter) and the movement angle φ of the moving-condition information D3 is smaller than a predetermined angle defining that the mobile station 3 is simply moving transversely ((referred to as a threshold angle, hereinafter); thus the PC control unit 44 activates the PC 4, through predetermined control data D4.

In this situation, when the transmission/reception distance of a user's information item D1 is within a predetermined distance indicating that the mobile station 3 is immediately in the vicinity of the fixed station 2 (referred to as a threshold distance, hereinafter), e.g., 30 [cm] apart from the fixed station 2, the PC control unit 44 logins the PC 4, by utilizing the user's ID of the user's information item D1.

As described above, by, each time a user's information item D1 and a moving-condition information D3 are forwarded from the moving-condition computing unit 43, controlling the PC 4, based on the user's information item D1 and the moving-condition information D3, the PC control unit 44 is adapted to be able to automatically activate, stop, or log in the PC 4, simply when the user approach or recede from the fixed station 2.

Figure 11:
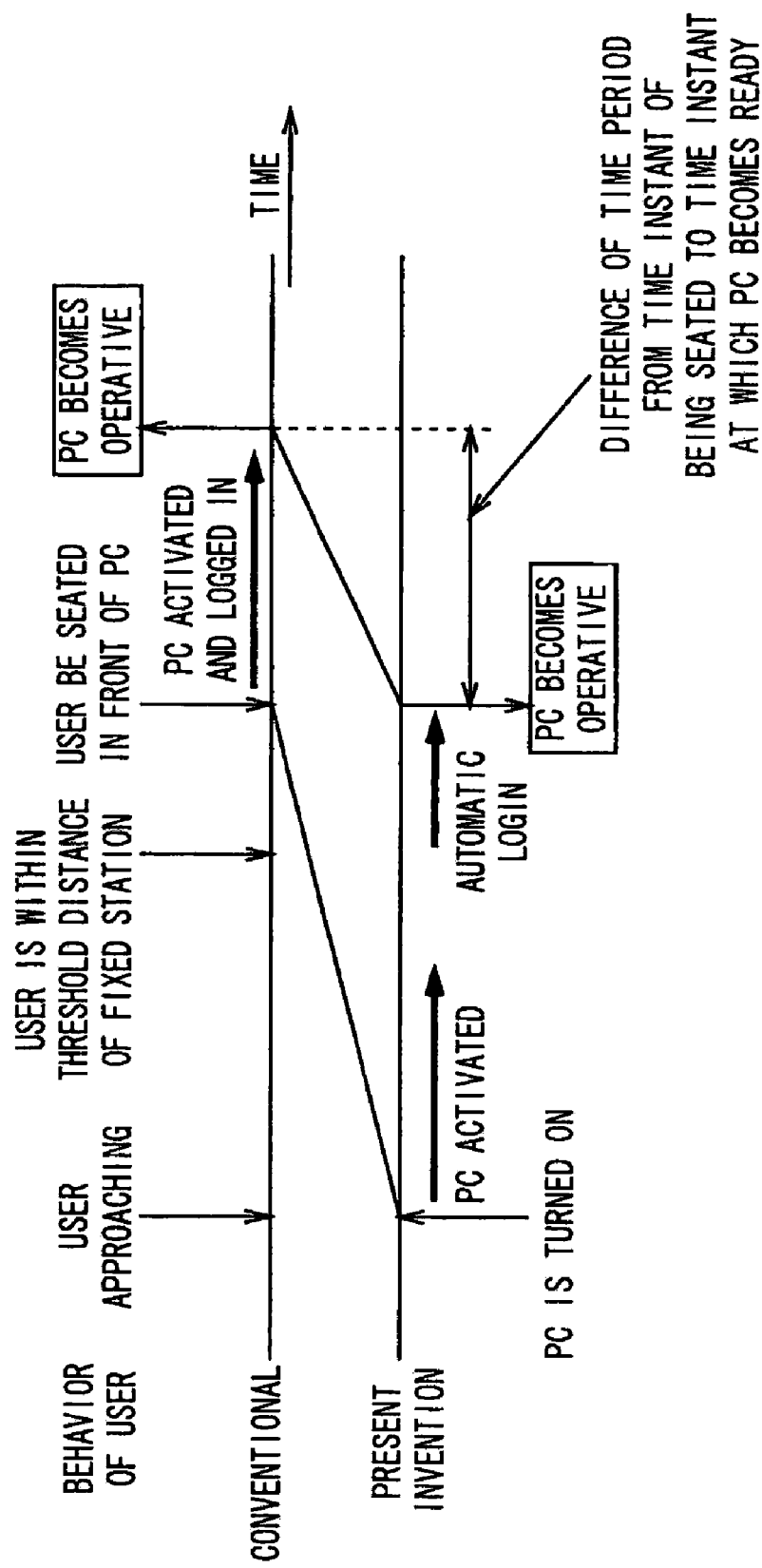
FIG. 11 is a diagram for schematically explaining the comparison between conventional PC control and PC control according to the present invention.

Here, in FIG. 11, the time difference between manual control of the PC 4 and automatic control of the PC 4, according to the present invention, is represented. As is clear from FIG. 11, according to the present invention, the PC 4 can be automatically controlled in response to the location of the user, with respect to the fixed station 2; therefore, the time period during which the PC 4 is activated, logged in, and become ready for operation can significantly be reduced in comparison to conventional systems.

(2-2-5) Control-Processing Procedure

Figure 12:
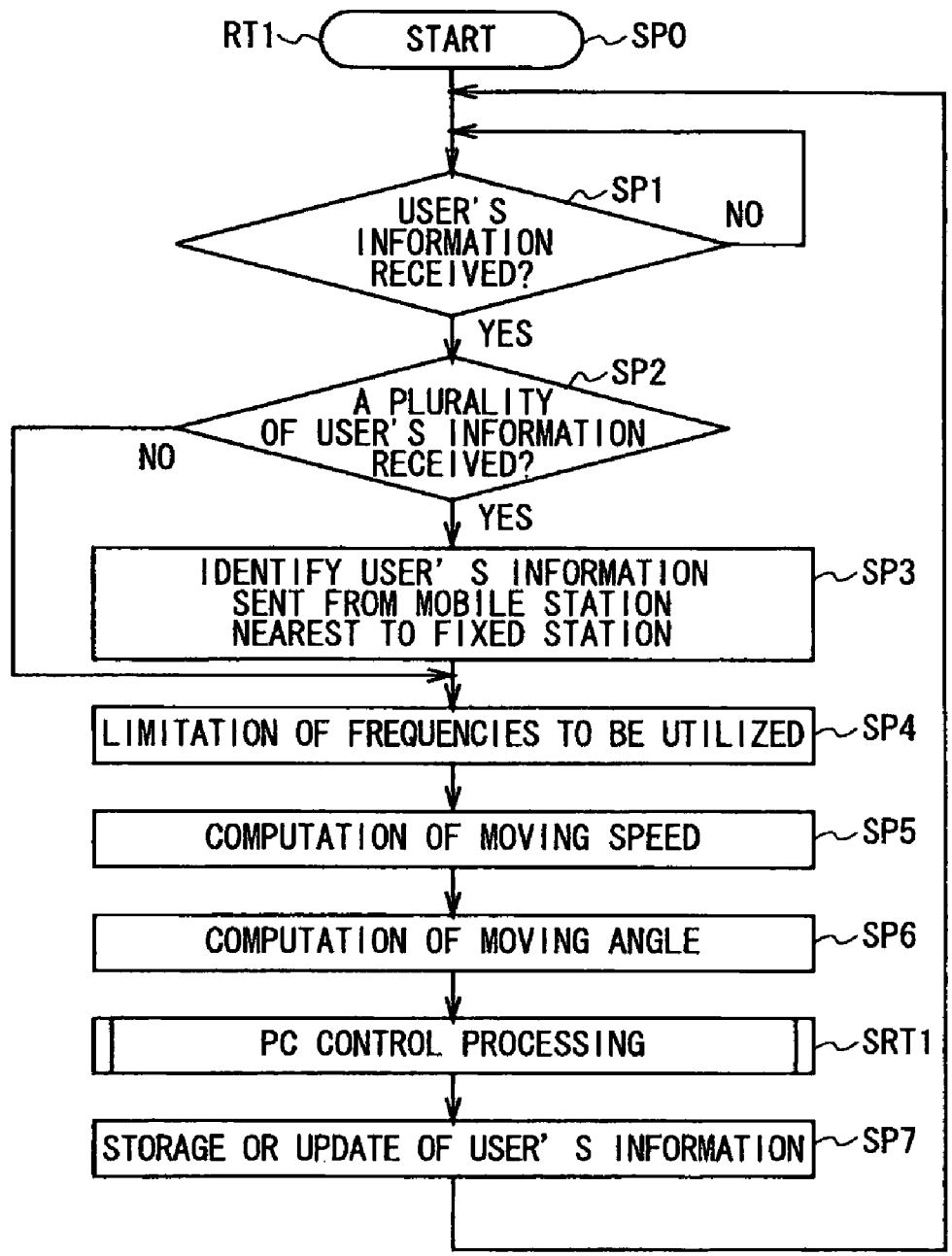
FIG. 12 is a flowchart illustrating control-processing procedure in a fixed station.

In effect, the controlling unit 40 implements various kinds of processing items as described above, in accordance with a control-processing procedure RT1 illustrated in FIG. 12.

In other words, for example, when the power supply for the fixed station 2 is turned ON, the controlling unit 40 starts the control-processing procedure RT1 with the step SP0, and waits for and receives in the step SP1 a user's information item D1.

If, in the step SP1, an affirmative result is obtained that indicates that a mobile station 3 (user) exists within a plurality of quasi-electrostatic fields formed through the communication electrode 10, the controlling unit 40 proceeds to the step SP2.

In the step SP2, the controlling unit 40 determines whether or not a plurality of user's information items D1a to D1n have been received; if a negative result is obtained, the controlling unit 40 proceeds to the step SP5; in contrast, if an affirmative result is obtained, the controlling unit 40 proceeds to the step SP3.

In the step SP3, by comparing the respective transmission/reception distances of the plurality of user's information items D1a to D1n, the controlling unit 40 identifies a user's information item D1 (D1a, D1b, . . . , or D1n) indicating the minimal transmission/reception distance, as the user's information item D1 that has been transmitted through a human-body antenna from a mobile station 3 that is closest to the fixed station 2, and then proceeds to the step SP4.

In the step SP4, by utilizing the transmission/reception distance of the user's information item D1 that has been received in the step SP1 or that has been identified in the step SP3, the controlling unit 40 selects the frequencies f1 to fk to be utilized, based on Equation (10) described above, and then proceeds to the step SP5 after making only quasi-electrostatic fields that correspond to the selected frequencies f1 to fk to be formed, thereby limiting the number of frequencies to be utilized.

In the step SP5, by utilizing the transmission/reception distance of the user's information item D1 and a past transmission/reception distance, of the user's information item D1, that has preliminarily been stored in the information-storage memory, the controlling unit 40 computes, in accordance with Equation (11) described above, the approach speed Va with respect to the fixed station 2, of the mobile station 3, and then proceeds to the following step SP6.

Figure 13:
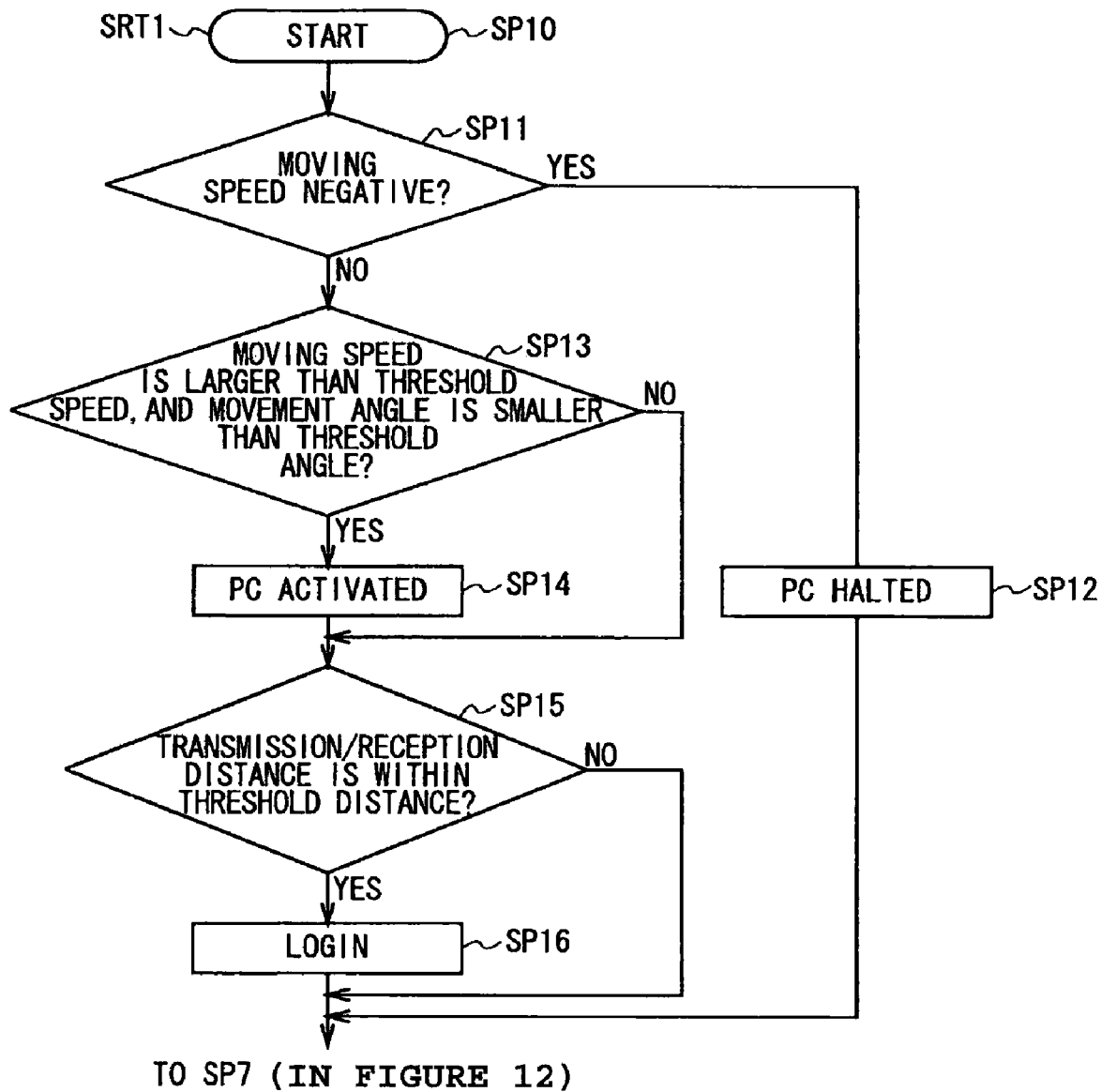
FIG. 13 is a flowchart illustrating control-processing procedure for a PC.

In the step SP6, by utilizing the approach speed Va computed in the step SP5 and the user's walking speed of the user's information item D1, the controlling unit 40 computes in accordance with the foregoing equation (12) the movement angle θ, of the mobile station 3, with respect to the line connecting the mobile station 3 and the fixed station 2, and then proceeds to a PC-control-processing routine SRT1 illustrated in FIG. 13.

The controlling unit 40 starts the PC-control-processing routine SRT1 with the step SP10, and determines in the following step SP11 whether or not the approach speed Va in the moving-condition information D3 is negative.

If, in the step SP11, an affirmative result is obtained that indicates that the mobile station 3 (user) is receding from the fixed station 2, the controlling unit 40 proceeds to the step SP12; after stopping the PC 4, if it has been activated, the controlling unit 40 proceeds to the step SP7 (in FIG. 12).

In contrast, if, in the step SP11, a negative result is obtained, the controlling unit 40 proceeds to the step SP13 and determines whether or not the approach speed Va computed in the step SP5 (in FIG. 12) is larger than a threshold speed, and the movement angle φ computed in the step SP6 (in FIG. 12) is smaller than a threshold angle.

If, in the step SP13, a negative result is obtained that indicates that, even though approaching the fixed station 2, the mobile station 3 (user) is almost at a stop, the controlling unit 40 proceeds to the step SP15.

In contrast, if an affirmative result is obtained that indicates that the mobile station 3 (user) is approaching the fixed station 2, the controlling unit 40 proceeds to the following step SP14; after activating the PC 4, if it is stopped, the controlling unit 40 proceeds to the following step SP15.

In the step SP15, only if the transmission/reception distance of the user's information item D1 received in the step SP1 or identified in the step SP3 is within a threshold distance, the controlling unit 40 proceeds to the following step SP16; after, if login has not been implemented, logging in the PC 4 by means of the user's ID corresponding to the user's information item D1, the controlling unit 40 proceeds to the following step SP7 (in FIG. 12).

In the step SP7, the controlling unit 40 stores in the information-storage memory the user's information item D1 received in the step SP1 or identified in the step SP3, or updates the contents of the information-storage memory, and then returns to the step SP1.

As described above, the controlling unit 40 is adapted to implement various kinds of processing items, in accordance with the control-processing procedure RT1 illustrated in FIG. 12. In addition, the controlling unit 40 may appropriately change the order of various kinds of processing items in the control-processing procedure RT1 illustrated in FIG. 12.

(2-3) Configuration of Mobile Station

Figure 14:
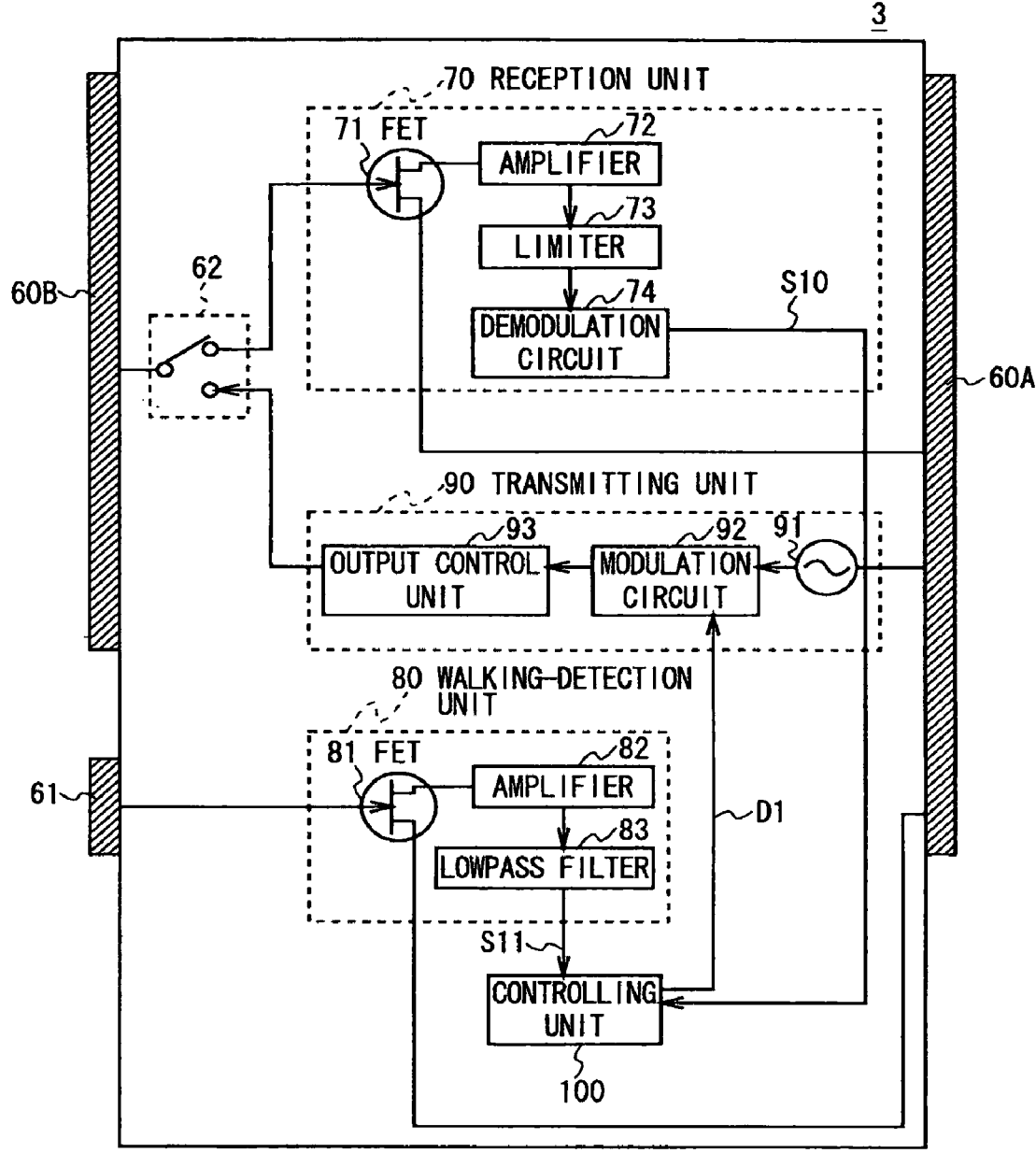
FIG. 14 is a block diagram schematically illustrating a configuration of a mobile station.

As illustrated in FIG. 14, the mobile station 3 is configured of a pair of communication electrodes 60A and 60B, a walking-detection electrode 61, a transmission/reception switch 62, a reception unit 70, a walking-detection unit 80, a transmitting unit 90, and a controlling unit 100.

The reception unit 70 receives sequentially through the communication electrode 60A, the transmission/reception switch 62, and the gate of an FET 71 the charged condition of a user (change in intensity) that, due to the user entering a plurality of quasi-electrostatic fields formed by the fixed station 2, changes in accordance with one or more frequencies f of the quasi-electrostatic fields in which the user exists, amplifies through an amplifier 72 the result of the reception, eliminates through a limiter 73 a signal having electric-field intensity lower than a predetermined level, and then, by way of a demodulation circuit 33, sends out as a received frequency signal S10 the resultant signal to a controlling unit 100.

When the user exists in the outermost among the plurality of the quasi-electrostatic fields formed by the fixed station 2, the received frequency signal S10 is represented as the frequency fn (in FIG. 6); in contrast, when the user exists in the innermost among the plurality of the quasi-electrostatic fields, the received frequency signal S10 is represented as the frequencies f1 to fn (in FIG. 6).

Meanwhile, by way of the walking-detection electrode 61 electrostatically coupled with the user, the walking-detection unit 80 detects through the gate of an FET 81 change, in charging on the surface of the human body, that is caused by a walking movement of the user, amplifies the change through an amplifier 82, eliminates through a lowpass filter 83 high-frequency components, and then sends out the resultant a walking-waveform signal S12 to the controlling unit 100.

As described above, in response to change, in the electrostatic capacitance between a foot and a road surface, that correspond to the foot trajectory made by a walking movement of the user and to change in electric charge, the walking-waveform signal S12 is represented as a pattern inherent to the user.

The transmitting unit 90 frequency-modulates through a modulation circuit 92 a carrier-wave signal generated by an oscillator 91, in accordance with a user's information item D1, controls the output, through an output control unit 93, and then, through a human-body antenna, transmits the result of the control, sequentially through the transmission/reception switch 62 and the communication electrode 60A.

In this situation, in accordance with the control of the controlling unit 100, the transmitting unit 90 is adapted to control the output in such a way that the quasi-electrostatic field is formed so as to range as far as the transmission/reception distance detected based on the received frequency signal S10.

The controlling unit 100 includes an unillustrated CPU (Central Processing Unit), a work memory, and an information-storage memory, and after, under the control of the CPU, reading out onto the work memory a predetermined control program stored in the information-storage memory, implements waveform processing. In addition to the control program, various kinds of information are stored in the information-storage memory.

Figure 15:
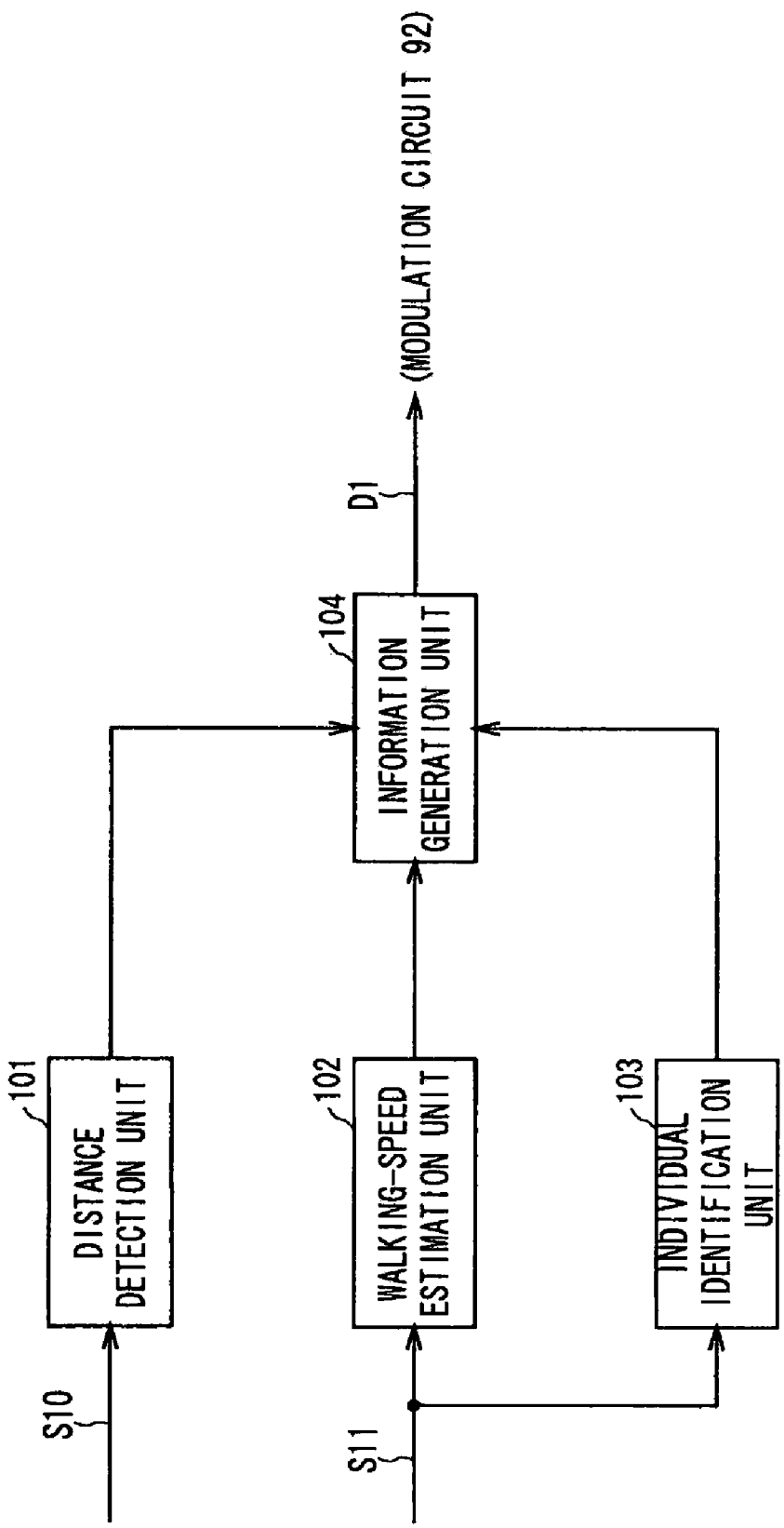
FIG. 15 is a block diagram illustrating processing by a controlling unit in a mobile station.

Here, as illustrated in FIG. 15, the contents of the control processing in the controlling unit 100 can be divided, from the viewpoint of a function, into a distance detection unit 101 for converting a received frequency signal S10 forwarded from the reception unit 70 into a transmission/reception distance between a user and the fixed station 2, a walking-speed estimation unit 102 for, based on a walking-waveform signal S12 forwarded from the walking-detection unit 80, estimating a walking speed of a user, an individual identification unit 103 for, based on the walking-waveform signal S12, identifying whether or not the user is an authentic user, and an information generation unit 104 for generating a user's information item D1, based on the respective processing results of the distance detection unit 101, the walking-speed estimation unit 102, and the individual identification unit 103. The processing by each of the distance detection unit 101, the walking-speed estimation unit 102, the individual identification unit 103, and the information generation unit 104 will be explained below.

(2-3-1) Processing by the Distance Detection Unit 101

The distance detection unit 101 preliminarily stores in the information-storage memory the same frequency/distance conversion table as that for the frequency selection unit 42 (in FIG. 8); by referring to the frequency selecting table, the distance detection unit 101 detects, as is the case with the diagrams and the table represented in FIG. 4 or the case of the fixed station 2, the transmission/reception distance, based on the frequencies f1 to fk indicated by the received frequency signal S10 forwarded from the reception unit 70, and then sends out the detected transmission/reception distance to the information generation unit 104.

(2-3-2) Processing by the Walking-Speed Estimation Unit 102

Figure 16:
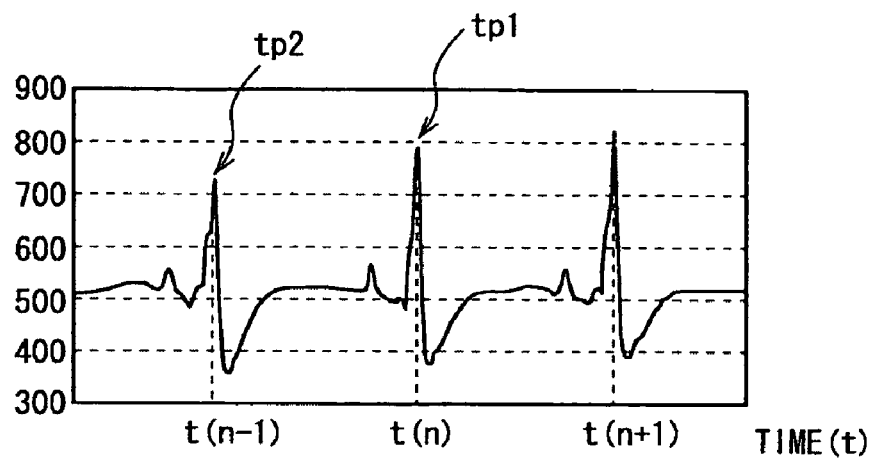
FIG. 16 is a graph schematically representing a waveform of change in charging, due to walking.

The walking-speed estimation unit 102 digitalizes for a predetermined time period the walking-waveform signal S12 forwarded from the walking-detection unit 80, temporarily stores in the information-storage memory the digitized walking waveforms and, as represented in FIG. 16, sequentially detects 8 Hz peaks, among the walking waveforms, that emerge within the bandwidth of 8±2 [Hz], and then estimates the stride of the user, based on the result of the detection.

Figure 17:
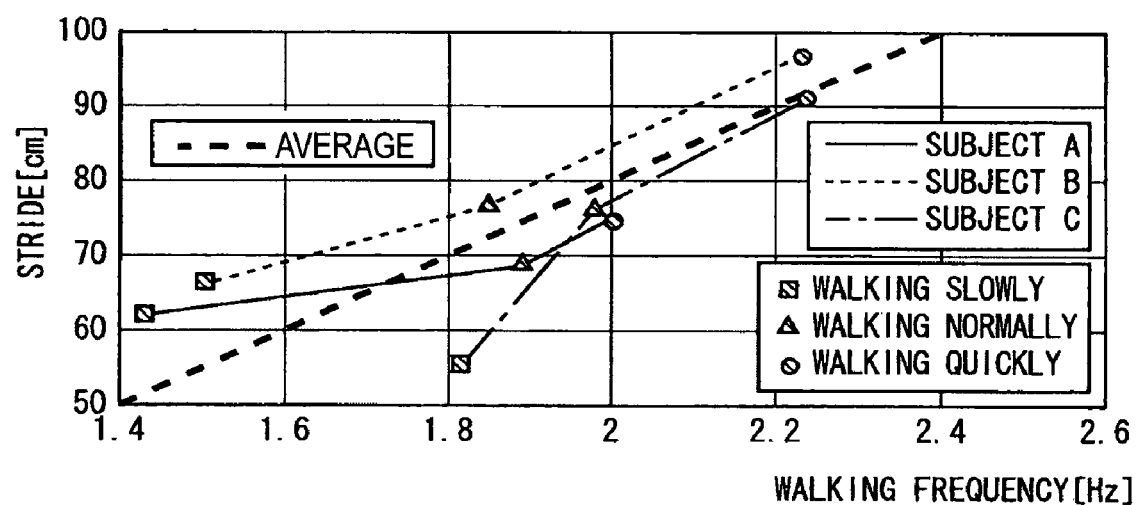
FIG. 17 is a graph representing the relationship between a stride and a walking frequency.

Here, FIG. 17 is a graph representing the relationship between the walking-frequency and the stride. As is clear from FIG. 17, for all experimental subjects, there is such a relationship that the higher the walking-frequency is (the larger a walking speed is), the longer the stride is. In FIG. 17, the thick broken line represents an average relationship between the walking-frequency and the stride; as the following equation, by representing the gradient as "50" and the ordinate intercept, as "−20", the stride can accurately be estimated based on the walking-frequency:

$$\text{Stride [cm]} = 50 \times \text{walking-frequency [Hz]} - 20 \quad (13)$$

Accordingly, letting tp1 denote a 8 Hz peak that is presently detected (referred to as a present 8 Hz peak, hereinafter) and tp2, an 8 Hz peak that has been detected immediately prior to the present 8 Hz peak (referred to as a previous 8 Hz peak, hereinafter), the walking-speed estimation unit 102 can estimate a stride ST, in accordance with the following equation:

$$ST = \frac{\alpha}{tp1 - tp2} + \beta \quad (14)$$

In Equation (14), by selecting as α "50" corresponding to the gradient in Equation (13) and as β, "−20" corresponding to the ordinate intercept in Equation (10), the walking-speed estimation unit 102 is adapted to be able to estimate a stride ST by which the actual stride is approximated.

Thereafter, by utilizing the stride ST estimated based on Equation (14), the walking-speed estimation unit 102 estimates the user's walking speed $V_{walk}$, in accordance with the following equation:

$$V_{walk} = \frac{ST}{tp1 - tp2} - \beta \quad (15)$$

As described above, by making an 8 Hz peak be an indicator that uniquely emerges as change in charging, on the surface of a human body, due to a walking movement, the walking-speed estimation unit 102 can precisely estimate a user's walking speed $V_{walk}$ and sends out the estimated user's walking speed $V_{walk}$ to the information generation unit 104.

(2-3-3) Processing by Individual Identification Unit 103

Figure 18:
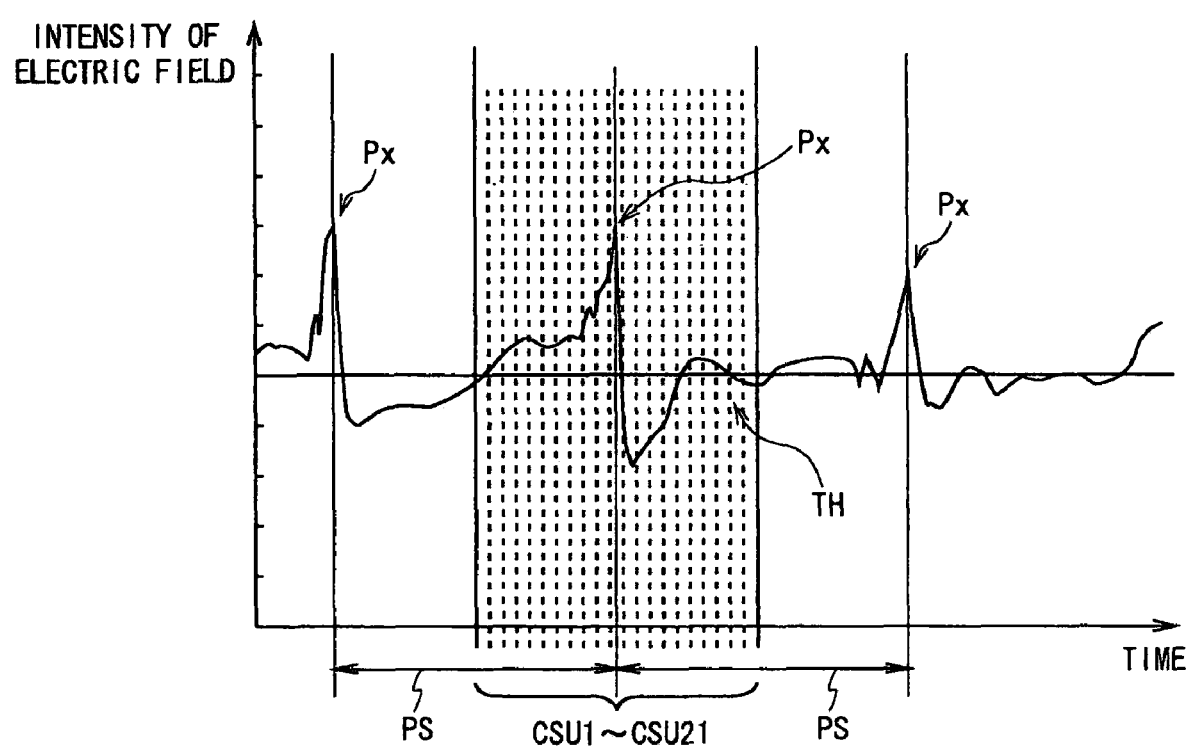
FIG. 18 is a graph for schematically explaining extraction and division of a waveform.

After detecting all 8 Hz peaks, among walking waveforms temporarily stored in the information-storage memory, that emerge within the bandwidth of 8±2 [Hz], the individual identification unit 103 removes peak intervals PS, among peak intervals between the neighboring detected 8 Hz peaks Px (in FIG. 18), that exceeds a predetermined allowable range with respect to information, on an average width for peak interval, that has been preliminarily stored in the information-storage memory.

In this case, by making an 8 Hz peak Px that uniquely emerges regardless of walking-movement modes be indicators, the individual identification unit 103 is adapted to be able to accurately leave only peak intervals PS corresponding to steady walking-movement portions.

Thereafter, the individual identification unit 103 extracts as a one-step waveform TH a range within the immediately preceding half PS and the immediately subsequent half PS, with respect to a target 8 Hz peak Px.

Also in this case, by making an 8 Hz peak that emerges when a right foot (left foot) is completely attached to the road surface be an indicator, the individual identification unit 103 is adapted to be able to accurately extract the range as a one-step waveform TH corresponding to an actual one step in a walking movement.

A walking information generation unit 45 divides a one-step waveform TH that emerges when a right foot (left foot) is completely attached to the road surface into, for example, 21 subdivided intervals CSU1 to CSU21 that each have the same time period, integrates and normalizes the respective amplitude values (intensity values of change in charging) for the subdivided intervals CSU1 to CSU21, and then generates the resultant 21 integrated values as walking information that represents the part-by-part features (a walking pattern) in the one-step waveform TH.

In this situation, the individual identification unit 103 compares the walking information with, for example, registered walking information that has preliminarily been registered in the information-storage memory, as is the case with generating of walking information, in supplying a user with a mobile station 3; if the result of the comparison indicates a coincidence rate higher than a predetermined value, the individual identification unit 103 determines that the user is an authentic user, and sends out the result of the determination to the information generation unit 104.

As described above, by implementing identification processing, based on the displacement, of intensity in a one-step waveform TH, that emerges, due to a walking movement, as an inherent pattern of an individual, the individual identification unit 103 is adapted to be able not only to accurately identify an authentic user, but also to prevent the third person who has thieved a mobile station 3 from passing oneself off as an authentic user.

(2-3-4) Processing by Information Generation Unit 104

Only when the result of the determination in the individual identification unit 103 indicates that the user is an authentic user, the information generation unit 104 generates as a user's information item D1 a transmission/reception distance converted by the distance detection unit 101, a user's walking speed estimated by the walking-speed estimation unit 102, and a user's ID preliminarily stored in the information-storage memory, and then sends out the user's information item D1 to the modulator 92.

(2-3-5) Waveform-Processing Procedure

Figure 19:
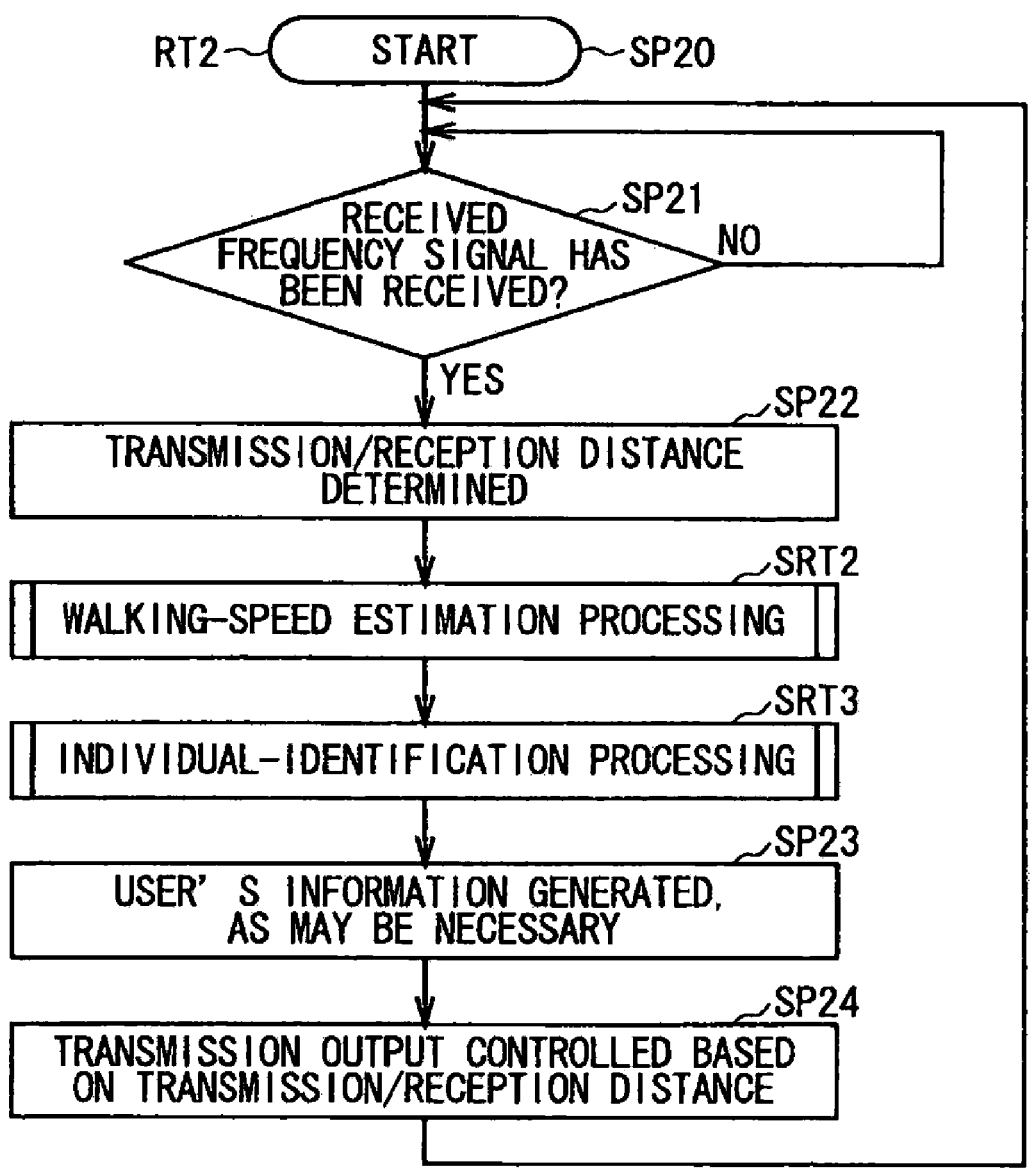
FIG. 19 is a flowchart illustrating control-processing procedure in a mobile station.

In effect, the controlling unit 100 implements various kinds of processing items as described above, in accordance with a waveform-processing procedure RT2 illustrated in FIG. 19.

In other words, for example, when the power supply for the mobile station 3 is turned ON, the controlling unit 100 starts the waveform-processing procedure RT2 with the step SP20, waits, in the step SP21, for a received frequency signal S10 forwarded from the reception unit 70, and then proceeds to the step SP22 after receiving the received frequency signal S10.

Figure 20:
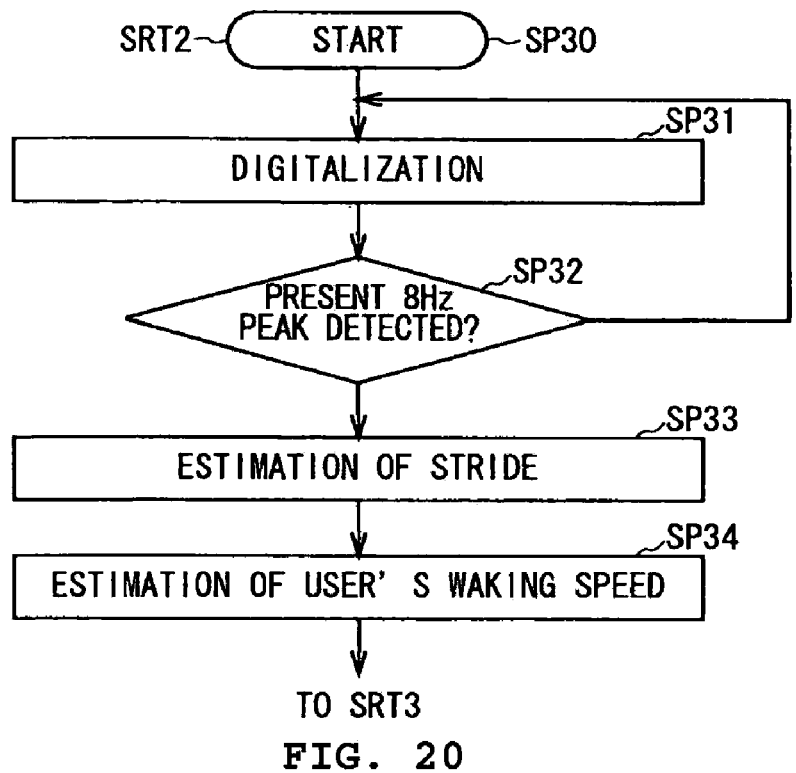
FIG. 20 is a flowchart illustrating walking-speed estimation-processing procedure.
Figure 21:
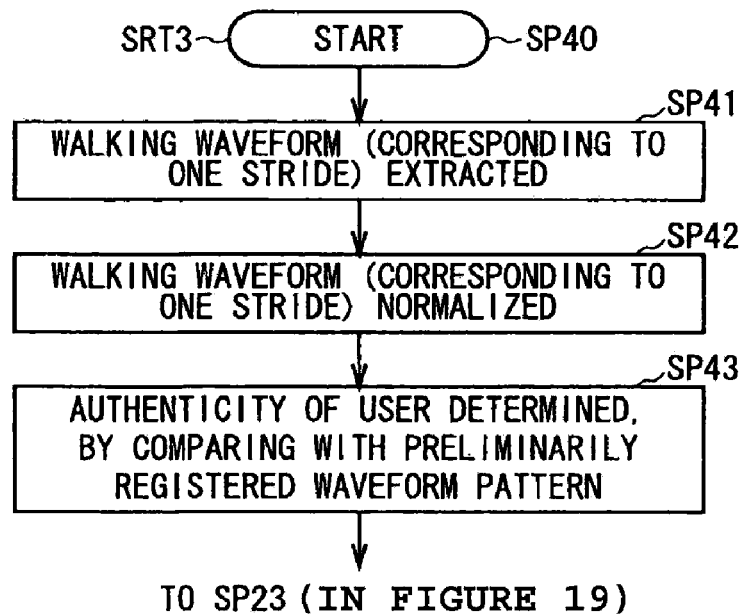
FIG. 21 is a flowchart illustrating individual-identification processing procedure.

In the step SP22, the controlling unit 100 converts the frequencies fj to fn indicated by the received frequency signal S10 into respective transmission/reception distances, and then proceeds to a walking-speed estimation-processing routine SRT2 illustrated in following FIG. 20.

The controlling unit 100 starts the walking-speed estimation-processing routine SRT2 with the step SP30, in the following step SP31 sequentially digitalizes a walking-waveform signal S12 forwarded from the walking-detection unit 80, and then, in the following step SP32, determines whether or not the present 8 Hz peak tp1, among the digitalized walking waveforms, that emerges within the bandwidth of 8±2 [Hz] has been detected.

In this situation, if an affirmative result is obtained, by utilizing the present 8 Hz peak tp1 detected in the step SP32 and the immediately previous 8 Hz peak tp2 that has preliminarily and temporarily been stored in the information-storage memory, the controlling unit 100 estimates, in the following step SP33, the stride ST, in accordance with Equation (15) described above, and then proceeds to the next step SP34.

In the step SP34, by utilizing the stride ST estimated in the step SP33, the present 8 Hz peak tp1, and the immediately previous 8 Hz peak tp2, the controlling unit 100 estimates the user's walking speed $V_{walk}$, in accordance with Equation (16) described above, and then proceeds to an individual-identification processing routine SRT3.

The controlling unit 100 starts the individual-identification processing routine SRT3 with the step SP40, detects, in the following step SP41, all 8 Hz peaks, among walking waveforms temporarily stored in the information-storage memory, that emerge within the bandwidth of 8±2 [Hz], removes peak intervals PS, among the peak intervals PS between the neighboring detected 8 Hz peaks Px, that exceed a predetermined allowable range, extracts a one-step waveform TH (in FIG. 18), and then proceeds to the following step SP42.

In the step SP42, by dividing the one-step waveform TH extracted in the step SP41 into subdivided intervals CSU1 to CSU21 that each have the same time period, and by integrating and normalizing the respective amplitude values (intensity values of change in charging) for the subdivided intervals CSU1 to CSU21, the controlling unit 100 generates walking information that represents the part-by-part features (a walking pattern) in the one-step waveform TH, and then proceeds to the following step SP43.

In the step SP43, by comparing the walking information generated in the step SP42 with the registered walking information that has preliminarily been registered in the information-storage memory, the controlling unit 100 determines whether or not the user is an authentic user, and then proceeds to the following step SP23 (in FIG. 19).

In the step SP23, only when the result of the determination in the step SP43 indicates that the user is an authentic user, the controlling unit 100 generates, as a user's information item D1, the transmission/reception distances converted in the step SP22, and the user's walking speed estimated in the step SP34, and the user's ID that has preliminarily been stored in the information-storage memory, and then proceeds to the following step SP24.

In the step SP24, the controlling unit 100 sends out to the modulation circuit 92 the user's information item D1 generated in the step SP23 and controls the output control unit 93 so that a quasi-electrostatic field is formed so as to range as far as the transmission/reception distance determined in the step SP22, and then returns to the step SP21.

In this situation, a quasi-electrostatic field covering the mobile station 3 and the fixed station 2 is formed through the user; in consequence, the user's information item D1 is transmitted from the mobile station 3, through a human-body antenna.

As described above, the controlling unit 100 is adapted to implement various kinds of processing items, in accordance with the waveform-processing procedure RT2 illustrated in FIG. 19. In addition, the controlling unit 100 may appropriately change the order of various kinds of processing items in the waveform-processing procedure RT2 illustrated in FIG. 19.

(3) Actions and Effects

With the foregoing configuration, as represented in FIG. 4 and the like, the fixed station 2 of the distance detection system 1 forms a plurality of quasi-electrostatic fields in such a way that constant intensity Ei can be obtained at the positions having respective intensity-boundary distances r1 to rn each corresponding to a plurality of frequencies f1 to fn.

Accordingly, because the fixed station 2 forms quasi-electrostatic fields in which a distance is extremely clearly reflected in intensity, in such a way that a predetermined intensity can be obtained at the positions having respective distances corresponding to a plurality of frequencies, it is possible to enhance, without requiring complicated control and a special apparatus, accuracy of distance detection based on the frequency of a quasi-electrostatic field received by the mobile station 3. In addition, the fixed station 2 forms a quasi-electrostatic field whose intensity is in inverse proportion to a distance raised to the third power; therefore, it is possible to prevent the third person from eavesdropping through a mobile station or the like.

Additionally, prior to forming a quasi-electrostatic field, the fixed station 2 is adapted to control the output power in such a way that a quasi-electrostatic field becomes dominant; thus, electric power can be saved by the amount corresponding to the controlled output power and the frequency of the quasi-electrostatic field can securely be received by the mobile station 3, without being suppressed by a radiated electromagnetic field or an induction field. In consequence, it is possible to further enhance accuracy of distance detection based on the frequency of a quasi-electrostatic field received by the mobile station 3.

Moreover, the fixed station 2 is adapted to select a frequency to be used, among the frequencies f1 to fn, based on the result of detection of the intensity of a quasi-electrostatic field; therefore, it is possible to suppress unnecessary power dissipation and to prevent an unnecessary electric field from propagating.

Still moreover, the fixed station 2 is adapted to select activation, stopping, or login, as control items for the PC 4, in accordance to the result of detection of the intensity of a quasi-electrostatic field; therefore, it is possible to automatically control the PC 4, in accordance with the detection position, and not only operation can be simplified to the extent corresponding to the automatization, but also the time period in which the PC 4 is activated/logged in and then is ready for operation can significantly be reduced in comparison to conventional systems.

Furthermore in the present embodiment, a distance based on the intensity can be detected with high accuracy (resolution); thus, erroneous operation in automatical controlling the PC 4 in accordance to the detection position can be reduced.

According to the foregoing configuration, because a plurality of quasi-electrostatic fields in which a distance is extremely clearly reflected in intensity is formed in such a way that constant intensity Ei can be obtained at the positions having respective intensity-boundary distances r1 to rn each corresponding to a plurality of frequencies f1 to fn, a distance based on the intensity can be detected with high accuracy, without requiring complicated control and a special apparatus, whereby it is possible to enhance with a simple configuration the accuracy of distance detection.

(4) Other Embodiments

Figures 22A, 22B:
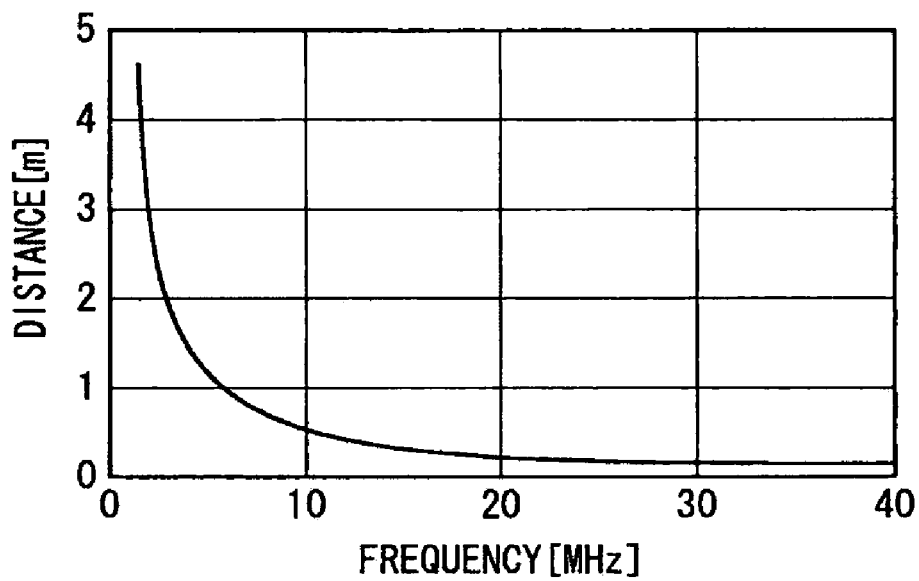
FIGS. 22A and 22B are a table and a graph, respectively, representing the relationship between intensity-boundary distance and frequency, in another embodiment.

In the foregoing embodiment, as represented in FIGS. 7A and 7B, the case has been described in which the respective frequencies are selected based on intensity-boundary distances; however, the present invention is not limited to that foregoing embodiment, and as represented in FIGS. 22A and 22B, the respective intensity-boundary distances may be selected based on frequencies.

Moreover, in the foregoing embodiment, the case has been described in which, as quasi-electrostatic-field forming means for forming quasi-electrostatic fields in such a way that, at the respective distances corresponding to a plurality of frequencies f1 to fn, predetermined intensity can be obtained, the transmission processing unit 21A to 21N are adopted that form quasi-electrostatic fields in such a way that constant intensity Ei can be obtained at the respective intensity-boundary distances r1 to rn corresponding to the plurality of frequencies f1 to fn; however, the present invention is not limited to that foregoing embodiment, i.e., the quasi-electrostatic fields may not necessarily be formed in such a way that constant intensity can be obtained, and spaces may not necessarily be formed in such a way that the quasi-electrostatic fields are always dominant; the point is that quasi-electrostatic-field forming means can be adopted that forms the quasi-electrostatic fields in such a way that, at each distance, predetermined intensity can be obtained that provides sensitivity not less than a predetermined reference level (e.g., the intensity of the weakest among electric fields that can be received by the mobile station 3).

Still moreover, in the foregoing embodiment, the case has been described in which the distance detection unit 101 (the controlling unit 100) as distance detection means for detecting a distance, based on the frequency of a quasi-electrostatic field received by the mobile station 3 that is provided on a moving subject, is provided at the mobile station 3; however, the present invention is not limited to that foregoing embodiment; i.e., the distance detection unit 101 may be provided at the fixed station 2. In this case, if the mobile station 3 transmits through a human-body antenna the received result (the number of quasi-electrostatic fields) to the fixed station 2, the fixed station 2 can detect the distance, based on the frequency of the quasi-electrostatic field.

Furthermore, in the foregoing embodiment, the case has been described in which, as reception means for receiving quasi-electrostatic fields that have been formed in such a way that predetermined intensity can be obtained at the respective distances corresponding to a plurality of frequencies, the reception unit 70 (in FIG. 14) that receives by means of the FET 71 is adopted; however, the present invention is not limited to that foregoing embodiment. For example, various other reception means can be applied to the present invention, such as an induction-electrode-type field intensity meter for measuring through a device configured of transistors and FETs a voltage induced by induction voltage, an induction-electrode-type, modulation-amplification-method field intensity meter for inverting by means of a chopper circuit, a vibrating capacitor, or the like a DC signal obtained through an induction electrode into an AC signal, and an electro-optical-effect field intensity meter for, by applying electric field to a substance having a electro-optic effect, measuring change, in properties of optical propagation, that occurs in the substance.

Moreover, in the foregoing embodiment, the case has been described in which, through the output-power adjusting units 24A to 24N as output power controlling means, for controlling output powers in such a way that spaces in which quasi-electrostatic fields are dominant are formed, the respective output powers corresponding to frequencies f1 to f(n−1) are adjusted in accordance with Equation (9), in such a way that the electric-field intensity at each of the frequencies fi to f(n−1) becomes the same as that at the lowest frequency fn; however, the present invention is not limited to that foregoing embodiment. For example, the output powers may be adjusted through various other methods, such as adjusting the respective output powers at the frequencies f1 to f(n−1) so that the electric-field intensity at each of the frequencies fi to f(n−1) becomes the same as that at the second lowest frequency fn or adjusting the output powers by utilizing filters, without utilizing a method other than Equation (9).

Still moreover, in the foregoing embodiment, the case has been described in which, as selecting means for selecting a frequency to be utilized, based on the frequency of a quasi-electrostatic field received by the mobile station 3 that is provided on a moving subject, the frequency selection unit 42 (the controlling unit 100) is applied that selects the frequency to be utilized, based on the transmission/reception distance corresponding to the number of frequencies of the quasi-electrostatic fields received by the mobile station 3; however, the present invention is not limited to that foregoing embodiment. The frequency to be utilized may be selected, by utilizing a user's walking speed in addition to the transmission/reception distance.

Specifically in this case, the frequency selection unit 42 is adapted to be able to retain data (information on a distance) from up to the second previous measurement. In this case, letting $r(t_{m-2})$ denote the distance between the mobile station 3 (the user) and the fixed station 2, at a time instant $t_{m-2}$, and $r(t_{m-1})$ denote the distance between the mobile station 3 (the user) and the fixed station 2, at a time instant $t_{m-1}$, the approach speed $v(t_{m-1})$ between the mobile station 3 (the user) and the fixed station 2, at the time instant $t_{m-1}$ is given by the following equation:

$$v(t_{m-1}) = \frac{r_{m-1} - r_{m-2}}{t_{m-1} - t_{m-2}} \tag{16}$$

Accordingly, the frequency selection unit 42 anticipates through the following equation the distance at a time instant $t_m$ (i.e., a distance to be measured from now) $r(t_m)$, obtains k that satisfies a relationship with regard to the anticipated distance $r(t_m)$, i.e., $r_{k-1} < r(t_m) < r_k$, and then selects frequencies $f_1$ to $f_k$ to be utilized.

$$r_0(t_m) = r(t_{m-1}) + v(t_{m-1}) \cdot (t - t_{m-1}) \tag{17}$$

In this manner, it is possible to make communication not liable to interruption, even when the mobile station 3 rapidly recedes from the fixed station 2.

Moreover, in consideration of a situation in which the anticipation on the distance $r(t_m)$ anticipated in accordance with Equation (17) fails, the frequency selection unit 42 may select the frequency $f_1$ to $f_{k+M}$ that include a margin as output frequencies; in this case, because the frequencies $f_{k+M+1}$ to $f_n$ are unnecessary, outputs therefor can be omitted, whereby power dissipation can also be reduced.

Still moreover, in the foregoing embodiment, the case has been described in which the walking-speed estimation unit 102, as speed estimation means for estimating the speed of a moving subject, estimates the walking speed of a user; however, the present invention is not limited to that foregoing embodiment. By changing the computing method for an approach speed in accordance with a moving subject such as an animal or an article being transported, the speeds of various other moving subjects can be estimated.

Furthermore, in the foregoing embodiment, the case has been described in which the transmitting unit 90, as notification means for notifying the speed of a moving subject, implements transmission through a human-body antenna; however, the present invention is not limited to that foregoing embodiment. Various other notification means can be applied to the present invention.

Still moreover, in the foregoing embodiment, the case has been described in which, as control means for, in accordance with the moving condition of a moving subject, switching control items for a predetermined control subject, the PC control unit 44 that, in accordance with the moving condition of a user, switches between activation, stopping and login that are control items for the PC 4 is applied to the present invention; however, the present invention is not limited to that foregoing embodiment. The control item may be switched to such processing that initiates a preliminarily set application such as connecting the PC 4 with the Internet or logging in a mail server, or, for example, in the case where the control subject is a vehicle, the PC control unit 44 may switch between processing items as the control items for the vehicle, such as cranking the engine or unlocking the door, in accordance with the moving condition of a user. The point is that control means for, with regard to various other control subjects, switching control items for the control subject, in accordance with the moving condition of a user can be applied to the present invention.

In this case, the control items are switched in accordance with the moving condition of the user; however, as described above, various other moving subjects, such as an animal or an article being transported, can be applied to the present invention.

Furthermore, in the foregoing embodiment, the case has been described in which the present invention is applied to the distance detection system 1 that detects the distance between the fixed station 2 and the mobile station 3 that is approaching the fixed station 2; however, the present invention is not limited to that foregoing embodiment. The present invention can also be applier to a distance detection system that detects the distance between mobile stations. In addition, in the foregoing embodiment, the present invention is utilized in an application that controls the PC 4, in response to the approach of the mobile station 3 to the fixed station 2; however, the point is that the present invention can widely be applied to distance detection systems having various other applications, as long as the systems detect (measure) distance.

As described above, according to the present invention, in a distance detection system configured of an electric-field forming apparatus and an electric-field receiving apparatus, quasi-electrostatic-field forming means for forming quasi-electrostatic fields, in such a way that a predetermined intensity can be obtained at the respective positions corresponding to a plurality of frequencies, is provided in the electric-field forming apparatus, and distance detection means for detecting a distance, based on the frequency of the quasi-electrostatic field received by the electric-field receiving apparatus, is provided in the electric-field forming apparatus or an electric-field receiving apparatus.

Accordingly, in the distance detection system, the electric-field forming apparatus forms a quasi-electrostatic field in which a distance is extremely clearly reflected in intensity, in such a way that a predetermined intensity can be obtained at the positions having respective distances corresponding to a plurality of frequencies; therefore, it is possible to enhance, without requiring complicated control and a special apparatus, the accuracy of distance detection based on the frequency of a quasi-electrostatic field received by the electric-field receiving apparatus, whereby it is possible to enhance with a simple configuration the accuracy of distance detection.

Moreover, as described above, according to the present invention, in an electric-field forming apparatus or in an electric-field forming method, a quasi-electrostatic field is formed in such a way that, at the respective distances corresponding to a plurality of frequencies, a predetermined intensity can be obtained.

Accordingly, in the electric-field forming apparatus or the electric-field forming method, quasi-electrostatic fields in which a distance is extremely clearly reflected in intensity are formed in such a way that a predetermined intensity can be obtained at the positions having respective distances corresponding to a plurality of frequencies; therefore, it is possible to enhance, without requiring complicated control and a special apparatus, the accuracy of distance detection based on the frequency of the quasi-electrostatic field received at receiving side, whereby it is possible to enhance with a simple configuration the accuracy of distance detection.

As described above, according to the present invention, in an electric-field receiving apparatus, or an electric-field receiving apparatus, provided on a moving subject, receiving means for receiving quasi-electrostatic fields formed in such a way that a predetermined intensity can be obtained at the respective positions corresponding to a plurality of frequencies, and distance detection means for detecting a distance, based on the frequency of the quasi-electrostatic field received by the receiving means, are provided.

Accordingly, in the electric-field receiving apparatus or the electric-field receiving method, quasi-electrostatic fields in which a distance is extremely clearly reflected in intensity are formed in such a way that a predetermined intensity can be obtained at the positions having respective distances corresponding to a plurality of frequencies; therefore, it is possible to enhance, without requiring complicated control and a special apparatus, the accuracy of distance detection based on the frequency of the received quasi-electrostatic field, whereby it is possible to enhance with a simple configuration the accuracy of distance detection.

INDUSTRIAL APPLICABILITY

The present invention is applicable to cases where control items for a control subject, for example, an electronic apparatus such as a video tape recorder, a television apparatus, a mobile phone or a personal computer, a medical apparatus, a vehicle, or a desk, are switched in response to the movement of a moving subject formed of a living organism such as a mammal, a reptile or botany, or a conductive material.

For example, the present invention can widely be applied to applications such as the case where, in approaching the vicinity of an opening/closing article such as a door or a lid, the opening/closing article is opened, as may be necessary, the case where, in approaching an electronic apparatus, the power supply is turned ON, or predetermined processing is started, as may be necessary, and the case where, when a predetermined identification subject is transported to a predetermined position on one of transport paths, the transport paths are switched, as may be necessary.

DESCRIPTION OF SYMBOLS

1 ... DISTANCE DETECTION SYSTEM, 2 ... FIXED STATION, 3 ... MOBILE STATION, 4 ... PC, 20, 90 ... TRANSMITTING UNIT, 22A TO 22N, 91 ... OSCILLATOR, 24A TO 24N ... OUTPUT-POWER ADJUSTING UNIT, 40, 100 ... CONTROLLING UNIT, 41 ... RECEIVED-DATA ANALYSIS UNIT, 42 ... FREQUENCY SELECTION UNIT, 43 ... MOVING-CONDITION COMPUTING UNIT, 44 ... PC CONTROL UNIT, 70 ... RECEPTION UNIT, 80 ... WALKING-DETECTION UNIT, 101 ... DISTANCE DETECTION UNIT, 102 ... WALKING-SPEED ESTIMATION UNIT, 103 ... INDIVIDUAL IDENTIFICATION UNIT, 104 ... INFORMATION GENERATION UNIT

The invention claimed is:

1. A distance detection system configured of an electric-field forming apparatus and an electric-field receiving apparatus, comprising:
   a quasi-electrostatic-field forming unit included in the electric-field forming apparatus, for forming quasi-electrostatic fields for a plurality of frequencies, an intensity of the quasi-electrostatic field for each frequency falling below a predetermined threshold intensity at a different distance from the quasi-electrostatic-field forming unit; and
   a distance detection unit included in either one of the electric-field forming apparatus and the electric-field receiving apparatus, for:
   storing a frequency/distance conversion table; and
   by referring to the frequency/distance conversion table, detecting a distance between the electric-field forming apparatus and the electric-field receiving apparatus, based on which frequencies of the quasi-electrostatic fields are received by the electric-field receiving apparatus.

2. The distance detection system according to claim 1, wherein the electric-field receiving apparatus comprises a speed estimation unit provided on a moving subject, for estimating a speed of the moving subject, and a notification unit for notifying the speed, of the moving subject, that is estimated through the speed estimation unit, and wherein the electric-field forming apparatus comprises a moving-condition estimation unit for estimating a moving condition of the moving subject, based on the distance detected through the distance detection unit and on the speed, of the moving subject, that is notified through the notification unit.

3. The distance detection system according to claim 2, wherein the electric-field forming apparatus comprises a controlling unit connected to a predetermined control subject, for switching control items for the control subject, in accordance with the moving condition estimated through the moving-condition estimation unit.

4. An electric-field forming apparatus comprising:
   a quasi-electrostatic-field forming unit for forming quasi-electrostatic fields for a plurality of frequencies, an intensity of the quasi-electrostatic field for each frequency falling below a predetermined threshold intensity at a different distance from the quasi-electrostatic-field forming unit; and
   a distance detection unit for:
   storing a frequency/distance conversion table; and
   by referring to the frequency/distance conversion table, detecting a distance between the electric-field forming apparatus and an electric-field receiving apparatus provided on a moving subject, based on which frequencies of the quasi-electrostatic fields are received by the electric-field receiving apparatus.

5. The electric-field forming apparatus according to claim 4, comprising an output power controlling unit for controlling output power of the quasi-electrostatic field for each frequency.

6. The electric-field forming apparatus according to claim 4, comprising a selection unit for selecting the plurality of frequencies, based on which frequencies of the quasi-electrostatic fields are received by the electric-field receiving apparatus.

7. The electric-field forming apparatus according to claim 4, comprising a moving-condition estimation unit for estimating a moving condition of the moving subject, based on the distance detected through the distance detection unit and on a speed, of the moving subject, that is estimated in the electric-field receiving apparatus.

8. The electric-field forming apparatus according to claim 7, comprising a controlling unit for switching control items for a predetermined control subject, in accordance with a moving condition, of the moving subject, that is estimated through the moving-condition estimation unit.

9. An electric-field forming method comprising:
   a quasi-electrostatic-field forming step of forming, with an electric-field forming apparatus, quasi-electrostatic fields for a plurality of frequencies, an intensity of the quasi-electrostatic field for each frequency falling below a predetermined threshold intensity at a different distance from the electric-field forming apparatus; and
   a distance detection step of, by referring to a frequency/distance conversion table, detecting a distance between the electric-field forming apparatus and an electric-field receiving apparatus provided on a moving subject, based on which frequencies of the quasi-electrostatic fields are received by the electric-field receiving apparatus.

10. The electric-field forming method according to claim 9, comprising an output power controlling step of controlling output power of the quasi-electrostatic field for each frequency.

11. The electric-field forming method according to claim 9, comprising a selection step of selecting the plurality of frequencies, based on which frequencies of the quasi-electrostatic fields are received by the electric-field receiving apparatus.

12. The electric-field forming method according to claim 9, comprising a moving-condition estimation step of estimating a moving condition of the moving subject, based on the distance detected through the distance detection step and on a speed, of the moving subject, that is estimated in the electric-field receiving apparatus.

13. The electric-field forming apparatus according to claim 12, comprising a controlling step of switching control items for a predetermined control subject, in accordance with a moving condition, of the moving subject, that is estimated in the moving-condition estimation step.

14. An electric-field receiving apparatus provided on a moving subject, comprising:
   a receiving unit for receiving from an electric-field forming apparatus quasi-electrostatic fields for a plurality of frequencies, an intensity of the quasi-electrostatic field for each frequency falling below a predetermined threshold intensity at a different distance from the electric-field forming apparatus; and a distance detection unit for:
- storing a frequency/distance conversion table; and
- by referring to the frequency/distance conversion table, detecting a distance, based on which frequencies of the quasi-electrostatic fields are received by the receiving unit.

15. The electric-field receiving apparatus according to claim 14, comprising a speed estimation unit for estimating a speed of the moving subject and a notification unit for notifying the speed, of the moving subject, that is estimated through the speed estimation unit.

16. An electric-field receiving method for an electric-field receiving apparatus provided on a moving subject, comprising:
- a receiving step of receiving from an electric-field forming apparatus quasi-electrostatic fields for a plurality of frequencies, an intensity of the quasi-electrostatic field for each frequency falling below a predetermined threshold intensity at a different distance from the electric-field forming apparatus; and
- a distance detection step of, by referring to a frequency/distance conversion table, detecting a distance, based on which frequencies of the quasi-electrostatic fields are received in the receiving step.

17. The electric-field receiving method according to claim 16, comprising a speed estimation step of estimating a speed of the moving subject and a notification step of notifying the speed, of the moving subject, that is estimated in the speed estimation step.

* * * * *